(12) United States Patent
Katsuhara et al.

(10) Patent No.: US 11,867,580 B2
(45) Date of Patent: Jan. 9, 2024

(54) SENSOR, INPUT DEVICE, AND ELECTRONIC APPARATUS

(71) Applicant: SONY GROUP CORPORATION, Tokyo (JP)

(72) Inventors: Tomoko Katsuhara, Kanagawa (JP); Akira Ebisui, Kanagawa (JP); Taizo Nishimura, Kanagawa (JP); Ken Kobayashi, Kanagawa (JP); Tetsuro Goto, Tokyo (JP); Yoshiaki Sakakura, Kanagawa (JP); Kei Tsukamoto, Kanagawa (JP); Hayato Hasegawa, Kanagawa (JP); Manami Miyawaki, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/838,111

(22) Filed: Jun. 10, 2022

(65) Prior Publication Data

US 2022/0390303 A1 Dec. 8, 2022

Related U.S. Application Data

(63) Continuation of application No. 16/330,620, filed as application No. PCT/JP2017/033355 on Sep. 14, 2017, now Pat. No. 11,402,283.

(30) Foreign Application Priority Data

Sep. 14, 2016 (JP) .................................. 2016-179992

(51) Int. Cl.
*G01L 5/00* (2006.01)
*G06F 3/044* (2006.01)
(Continued)

(52) U.S. Cl.
CPC .............. *G01L 5/00* (2013.01); *G06F 3/0445* (2019.05); *G06F 3/0446* (2019.05);
(Continued)

(58) Field of Classification Search
CPC ...... G06F 9/4418; G06F 3/041; G06F 3/0447; G06F 3/0446; G06F 3/0445;
(Continued)

(56) References Cited

U.S. PATENT DOCUMENTS 7,800,592 B2 9/2010 Kerr et al.
8,704,787 B2 * 4/2014 Yamamoto ............ G06F 3/0416
345/173
(Continued)

FOREIGN PATENT DOCUMENTS

CN 103946777 7/2014
CN 105431804 3/2016
(Continued)

OTHER PUBLICATIONS

International Search Report and Written Opinion for International (PCT) Patent Application No. PCT/JP2017/033355, dated Oct. 10, 2017, 7 pages.
(Continued)

*Primary Examiner* — Vinh T Lam
(74) *Attorney, Agent, or Firm* — SHERIDAN ROSS P.C.

(57) ABSTRACT

An electronic apparatus includes: an exterior body; a pressure-sensitive sensor having a sensing face; and a support supporting the pressure-sensitive sensor such that inner faces the exterior body is opposed to the sensing face.

23 Claims, 32 Drawing Sheets

(51) Int. Cl.
  *G06F 9/4401* (2018.01)
  *G06F 3/0485* (2022.01)
  *G06F 3/16* (2006.01)
  *H04N 23/62* (2023.01)
(52) U.S. Cl.
  CPC .......... *G06F 3/0447* (2019.05); *G06F 9/4418* (2013.01); *G06F 3/0485* (2013.01); *G06F 3/165* (2013.01); *H04N 23/62* (2023.01)
(58) Field of Classification Search
  CPC ................. G06F 3/0443; G06F 3/165; G06F 2203/04105; G06F 3/0485; G01L 5/00; G01L 1/14; H04N 23/62
  See application file for complete search history.

(56) References Cited

U.S. PATENT DOCUMENTS

| | | | | |
|---|---|---|---|---|
| 9,007,338 B2* | 4/2015 | Suzuki | ............... | G06F 3/03547 345/174 |
| 9,513,719 B2* | 12/2016 | Ito | ............... | G06F 3/03545 |
| 9,702,778 B2* | 7/2017 | Horie | ............... | G01D 5/2046 |
| 9,836,153 B2* | 12/2017 | Yamano | ............... | H01G 5/16 |
| 10,175,782 B2* | 1/2019 | Katsuhara | ............... | G06F 3/04883 |
| 10,831,299 B1* | 11/2020 | Lukens | ............... | G06F 3/0416 |
| 2010/0079395 A1 | 4/2010 | Kim et al. | | |
| 2011/0037624 A1 | 2/2011 | Pance et al. | | |
| 2011/0175845 A1* | 7/2011 | Honda | ............... | G06F 3/0445 345/174 |
| 2012/0127099 A1* | 5/2012 | Liu | ............... | G06F 3/0446 200/600 |
| 2012/0218206 A1 | 8/2012 | Sato et al. | | |
| 2012/0258652 A1* | 10/2012 | Koehnle | ............... | B24B 37/26 451/526 |
| 2013/0169589 A1* | 7/2013 | Suzuki | ............... | G06F 3/045 345/174 |
| 2013/0234734 A1* | 9/2013 | Iida | ............... | G01L 1/146 324/661 |
| 2015/0054780 A1 | 2/2015 | Manba | | |
| 2015/0085179 A1 | 3/2015 | Van Heugten | | |
| 2015/0355684 A1 | 12/2015 | Nakamura | | |
| 2015/0355797 A1 | 12/2015 | Shinkai et al. | | |
| 2016/0026297 A1* | 1/2016 | Shinkai | ............... | G06F 3/0447 345/174 |
| 2016/0210518 A1 | 7/2016 | Script et al. | | |
| 2016/0291731 A1* | 10/2016 | Liu | ............... | G06F 3/044 |
| 2017/0192506 A1 | 7/2017 | Andersen et al. | | |
| 2017/0329444 A1* | 11/2017 | Hwang | ............... | G06F 3/0443 |
| 2017/0351349 A1 | 12/2017 | Fassett et al. | | |
| 2017/0372122 A1* | 12/2017 | Shim | ............... | G06V 40/1306 |
| 2018/0086890 A1* | 3/2018 | Dohi | ............... | G06F 3/041 |
| 2018/0161674 A1 | 6/2018 | Kohara | | |
| 2018/0188874 A1 | 7/2018 | Cho et al. | | |
| 2019/0121220 A1* | 4/2019 | Iwase | ............... | G06F 3/0488 |
| 2019/0222744 A1 | 7/2019 | Qin et al. | | |
| 2019/0376852 A1 | 12/2019 | Kobayashi et al. | | |
| 2021/0181897 A1 | 6/2021 | Katsuhara et al. | | |

FOREIGN PATENT DOCUMENTS

| | | |
|---|---|---|
| EP | 1840715 | 10/2007 |
| JP | 3778148 | 5/2006 |
| JP | 2011-170659 | 9/2011 |
| JP | 2011-197991 | 10/2011 |
| JP | 2013-132855 | 7/2013 |
| JP | 5686941 | 3/2015 |
| JP | 5714935 | 5/2015 |
| JP | 2015-232752 | 12/2015 |
| JP | 2015-232753 | 12/2015 |
| WO | WO 2013/100067 | 7/2013 |
| WO | WO 2014/147943 | 9/2014 |
| WO | WO 2015/115411 | 8/2015 |

OTHER PUBLICATIONS

Official Action (with English translation) for Japan Patent Application No. 2020-146630, dated Feb. 2, 2021, 6 pages.
Official Action for Europe Patent Application No. 17850996.4, dated Nov. 23, 2021, 7 pages.
Official Action for U.S. Appl. No. 16/330,620, dated Apr. 9, 2021, 18 pages.
Official Action for U.S. Appl. No. 16/330,620, dated Jul. 20, 2021, 21 pages.
Official Action for U.S. Appl. No. 16/330,620, dated Nov. 24, 2021, 21 pages.
Notice of Allowance for U.S. Appl. No. 16/330,620, dated Mar. 16, 2022, 12 pages.

* cited by examiner

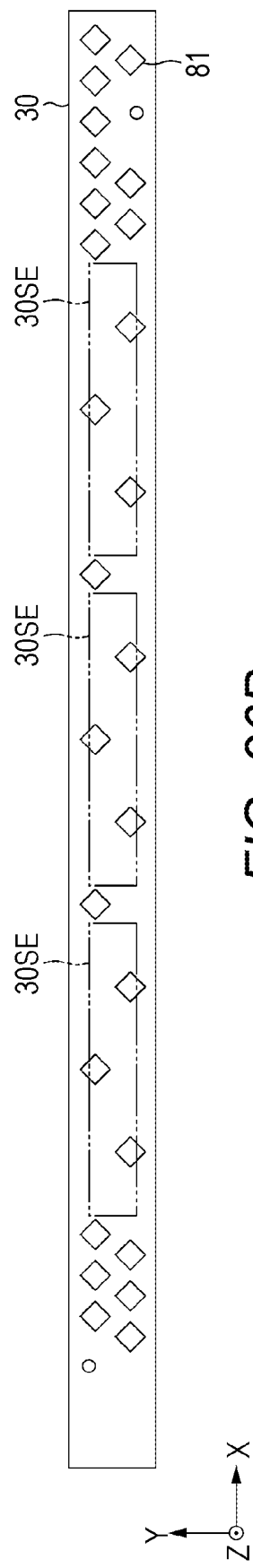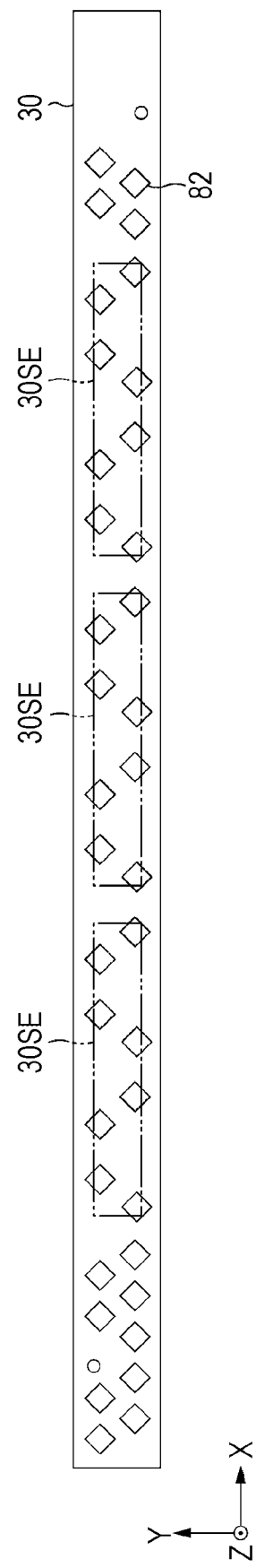

SENSOR, INPUT DEVICE, AND ELECTRONIC APPARATUS

CROSS REFERENCE TO RELATED APPLICATIONS

This application is a continuation of U.S. patent application Ser. No. 16/330,620 filed Mar. 5, 2019, issued as U.S. Pat. No. 11,402,283, which is a national stage application under 35 U.S.C. 371 and claims the benefit of PCT Application No. PCT/JP2017/033355 having an international filing date of Sep. 14, 2017, which designated the United States, which PCT application claimed the benefit of Japanese Patent Application No. 2016-179992 filed Sep. 14, 2016, the entire disclosures of each of which are incorporated herein by reference.

TECHNICAL FIELD

The present technology relates to a sensor, an input device, and an electronic apparatus.

BACKGROUND ART

In recent years, a sensor capable of electrostatically detecting an input operation has been widely used for various electronic apparatuses such as a mobile personal computer (PC) and a tablet PC. As a sensor for electronic apparatuses, there is known a sensor including a capacity element and capable of detecting an operation position of an operation element and a pressing force on an input operation face (see, for example, Patent Document 1).

CITATION LIST

Patent Document

Patent Document 1: Japanese Patent Application Laid-Open No. 2011-170659

SUMMARY OF THE INVENTION

Problems to be Solved by the Invention

An object of the present technology is to provide a sensor, an input device, and an electronic apparatus capable of detecting pressing on the surface of an exterior body.

Solutions to Problems

In order to solve the above-described problem, a first technology is an electronic apparatus including:
an exterior body;
a pressure-sensitive sensor having a sensing face; and
a support supporting the pressure-sensitive sensor such that an inner face of the exterior body is opposed to the sensing face.
A second technology is an input device including:
an exterior body;
a pressure-sensitive sensor having a sensing face; and
a support supporting the pressure-sensitive sensor such that an inner face of the exterior body is opposed to the sensing face.
A third technology is a sensor including:
an electrostatic-capacity-type sensor electrode unit having a plurality of sensing units;
a first reference electrode layer opposed to a first main face of the sensor electrode unit;
a second reference electrode layer opposed to a second main face of the sensor electrode unit; and
a deformable layer provided at least either between the first reference electrode layer and the sensor electrode unit or between the second reference electrode layer and the sensor electrode unit, the deformable layer being elastically deformed by application of pressure,
in which the deformable layer includes a foamed resin.

Effects of the Invention

According to the present technology, pressing on the surface of an exterior body can be detected. Note that the effects described herein are not necessarily limited, and any of the effects described in the present disclosure may be applied.

BRIEF DESCRIPTION OF DRAWINGS

FIG. 26A is a plan view illustrating the arrangement form of the columnar body provided on one main face of a sensor electrode unit.

FIG. 26B is a plan view illustrating the arrangement form of the columnar body provided on the other main face of the sensor electrode unit.

MODE FOR CARRYING OUT THE INVENTION

Embodiments of the present technology will be described in the following order.

1 First Embodiment (example of a smartphone as the electronic apparatus)

2 Second Embodiment (example of a smartphone as the electronic apparatus)

3 Third Embodiment (example of a laptop personal computer as the electronic apparatus)

1 First Embodiment

[Configuration of Electronic Apparatus]

Figure 1A:
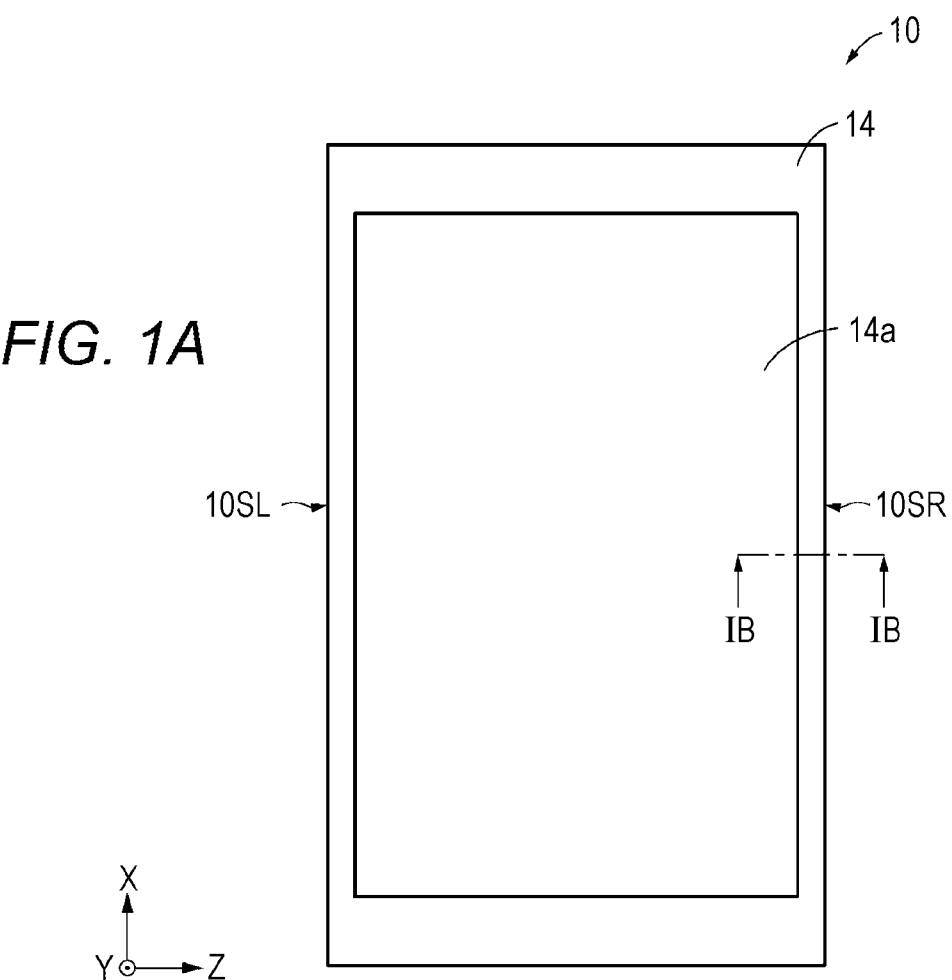
FIG. 1A is a plan view of the exterior appearance of an electronic apparatus according to a first embodiment of the present technology.
Figure 1B:
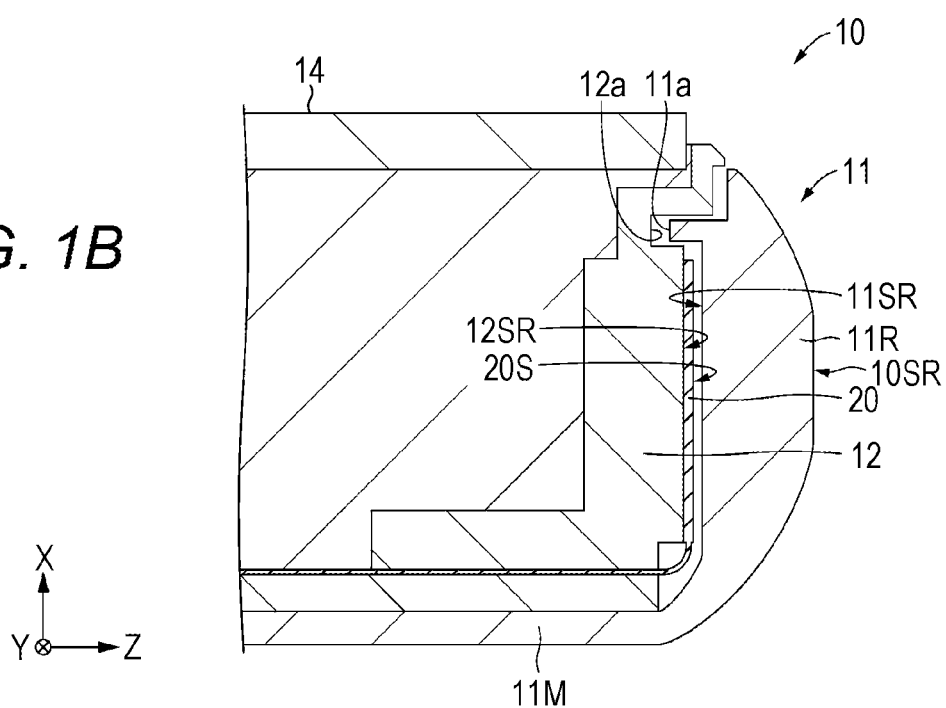
FIG. 1B is a cross-sectional view taken along line IB-IB of FIG. 1A.
Figure 2:
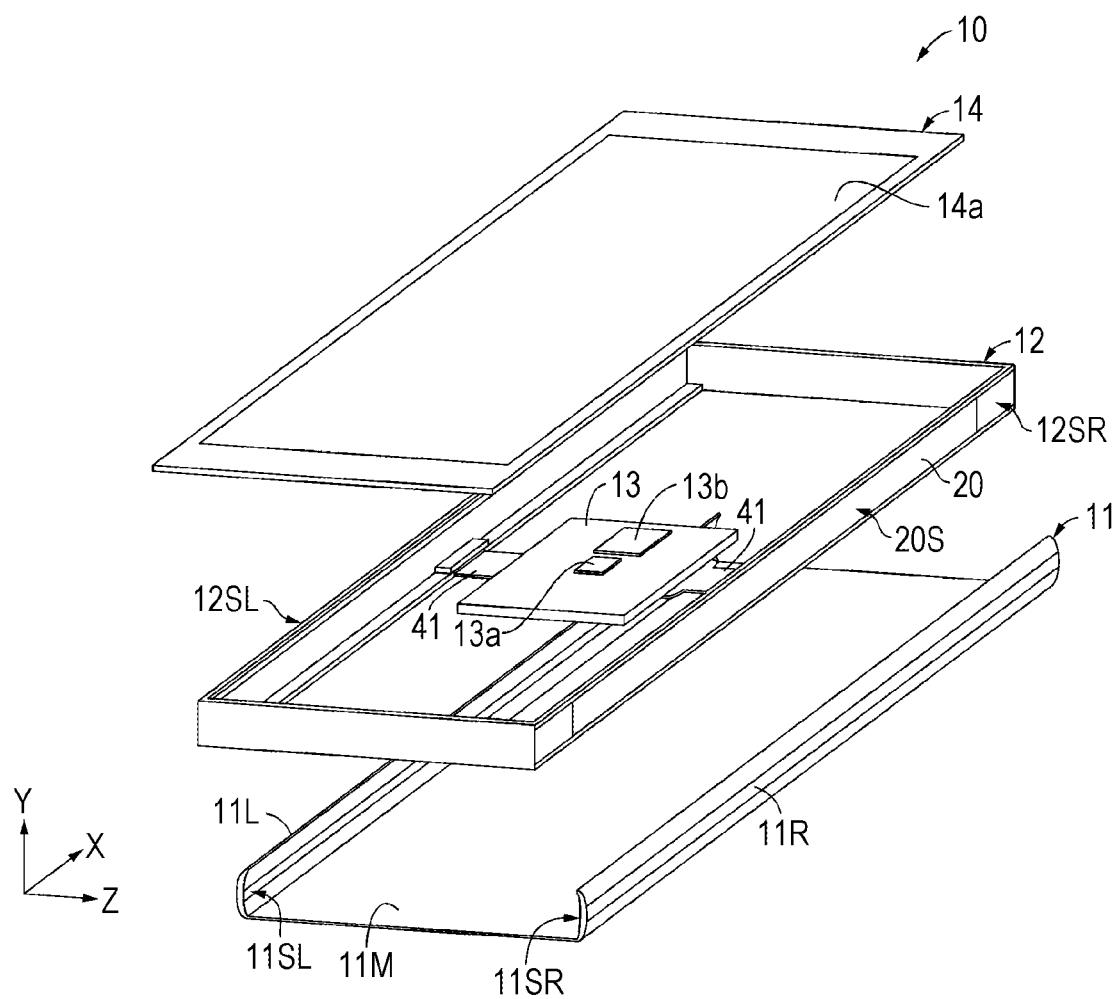
FIG. 2 is an exploded perspective view of the configuration of the electronic apparatus according to the first embodiment of the present technology.

Hereinafter, an electronic apparatus 10 according to a first embodiment of the present technology will be described with reference to FIGS. 1A, 1B, and 2. The electronic apparatus 10 according to the first embodiment of the present technology is a so-called smartphone, and includes: an exterior body 11 as a casing; two sensors 20 each having a sensing face 20S; a frame 12 as a support supporting the sensor 20 such that an inner face 11SR of the exterior body 11 is opposed to the sensing face 20S and an inner face 11SL of the exterior body 11 is opposed to the sensing face 20S; a substrate 13 disposed in the frame 12; and a front panel 14 provided on the frame 12.

With the electronic apparatus 10, (1) wake-up operation, (2) slide operation, (3) automatic startup operation for a camera application, (4) right/left hand detection function, and the like can be performed by pressing side faces 10SR and 10SL of the electronic apparatus 10 with a hand, a finger, or the like.

The exterior body 11, the sensors 20, and the frame 12 as the support are included in an input device. The input device may further include the substrate 13 as necessary.

(Exterior Body)

The exterior body 11 includes a rectangular main face 11M forming the back face of the electronic apparatus 10 and sidewalls 11R and 11L provided on the respective long sides of the main face 11M. The frame 12 is accommodated between the sidewalls 11R and 11L. The sidewalls 11R and 11L are capable of pressing the sensing faces 20S such that the sidewalls 11R and 11L press against the sensing faces 20S. A protrusion 11a is provided near the leading end portion of the inner face 11SR. The protrusion 11a engages with a recess 12a provided on a support face 12SR of the frame 12. The inner face 11SL also has a configuration similar to that of the inner face 11SR, and a support face 12SL also has a configuration similar to that of the support face 12SR, respectively.

The exterior body 11 includes, for example, a metal, a polymer resin, wood, or the like. Examples of the metal include simple substances such as aluminum, titanium, zinc, nickel, magnesium, copper, and iron, or an alloy containing two or more these metals. Specific examples of the alloy include stainless used steel (SUS), aluminum alloy, magnesium alloy, titanium alloy, and the like. Examples of the polymer resin include a copolymerized synthetic resin (acrylonitrile-butadiene-styrene (ABS) resin) of acrylonitrile, butadiene, and styrene, a polycarbonate (PC) resin, a PC-ABS alloy resin, and the like.

(Frame)

With the frame 12 in plan view in a direction perpendicular to the main face 11M, the frame 12 has a rectangular shape slightly smaller than that of the main face 11M. The frame 12 has the support faces 12SR and 12SL opposed to the inner face 11SR of the sidewall 11R and the inner face 11SL of the sidewall 11L, respectively. The sensor 20 is supported on the support face 12SR such that the inner face 11SR of the sidewall 11R is opposed to the sensing face 20S. A space is provided between the sensing face 20S and the inner face 11SR. The sensor 20 is supported on the support face 12SL such that the inner face 11SL of the sidewall 11L is opposed to the sensing face 20S. A space is provided between the sensing face 20S and the inner face 11SL.

(Substrate)

The substrate 13 is a main substrate of the electronic apparatus 10 and includes a controller integrated circuit (IC) (hereinafter simply referred to as "IC") 13a and a main central processing unit (CPU) (hereinafter simply referred to as "CPU") 13b. The IC 13a is a control unit that controls the two sensors 20 and detects pressure applied to the respective sensing faces 20S. The CPU 13b is a control unit that controls the entire electronic apparatus 10. For example, the CPU 13b executes various types of processing on the basis of a signal supplied from the IC 13a.

(Front Panel)

The front panel 14 includes a display device 14a, and an electrostatic-capacity-type touch panel is provided on the surface of the display device 14a. The display device 14a displays a picture (screen), on the basis of a picture signal or the like supplied from the CPU 13b. Examples of the display device 14a include a liquid crystal display, an electroluminescence (EL) display, and the like, but are not limited thereto.

(Sensor)

Figure 3A:
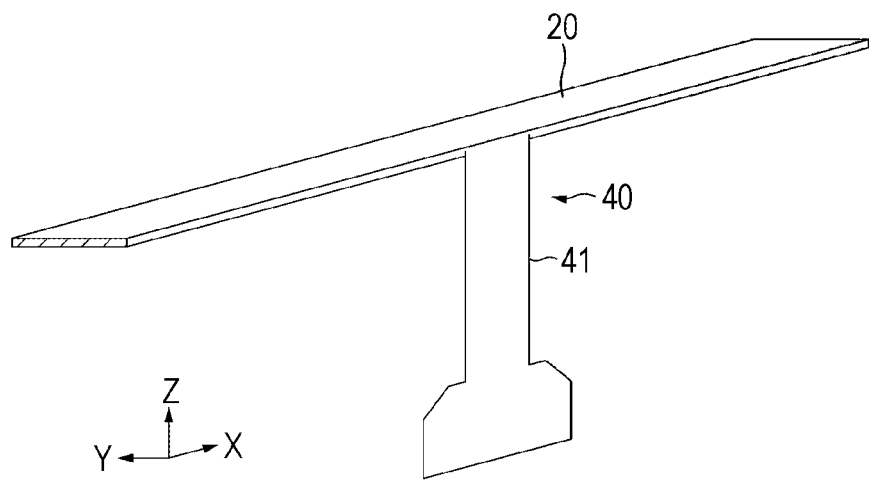
FIG. 3A is a perspective view illustrating the shape of a sensor.
Figure 5:
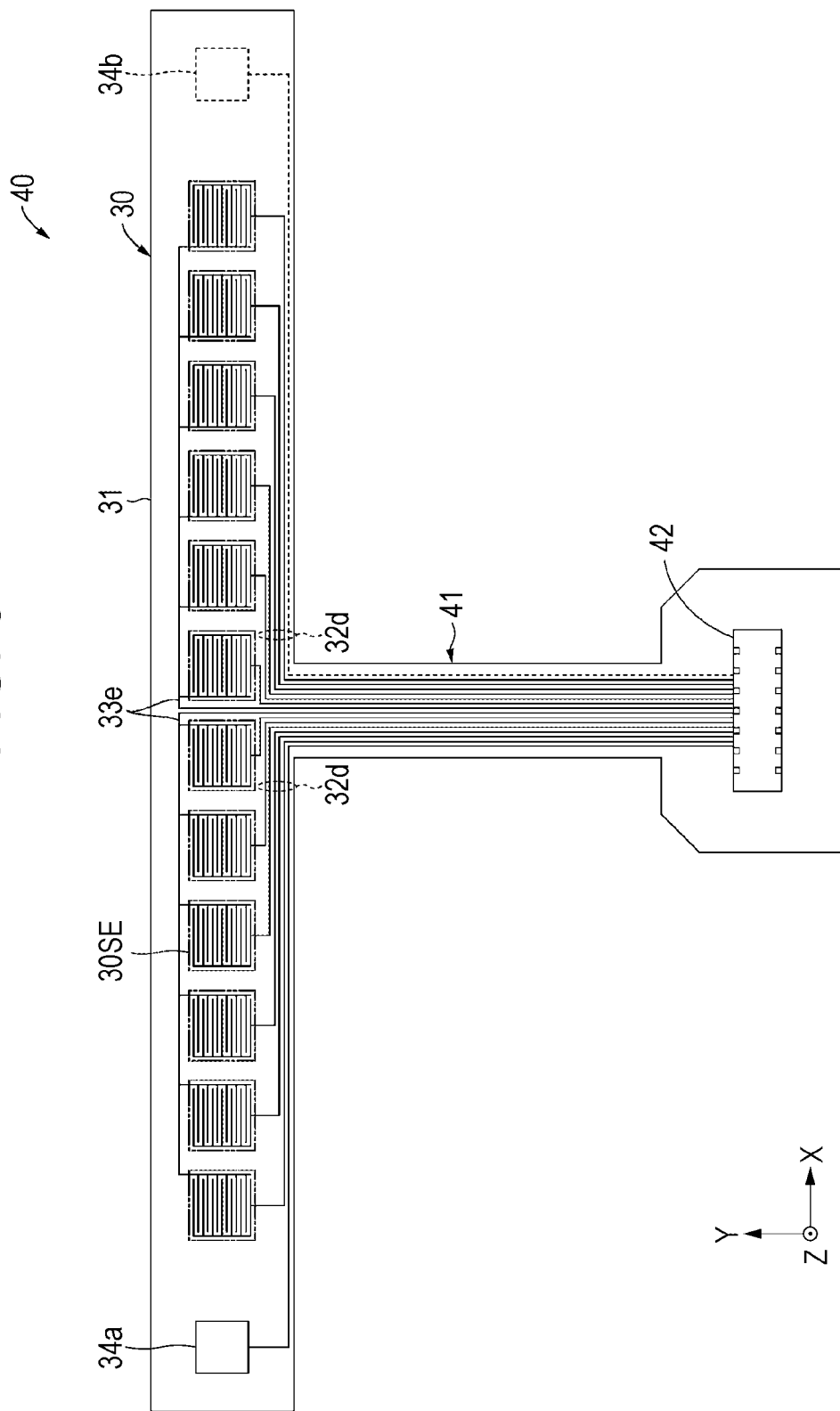
FIG. 5 is a plan view illustrating the configuration of a flexible printed circuit.

The sensor 20 is a so-called pressure-sensitive sensor, and has an elongated rectangular shape as illustrated in FIG. 3A. A connecting portion 41 extends from the center of the long side of the sensor 20. More specifically, as illustrated in FIG. 5, the sensor 20 includes a sensor electrode unit 30 having an elongated rectangular shape, and the connecting portion 41 extends from the center of the long side of the sensor electrode unit 30. The sensor electrode unit 30 and the connecting portion 41 are integrally formed by one flexible printed circuit (hereinafter referred to as "FPC") 40.

Figure 3B:
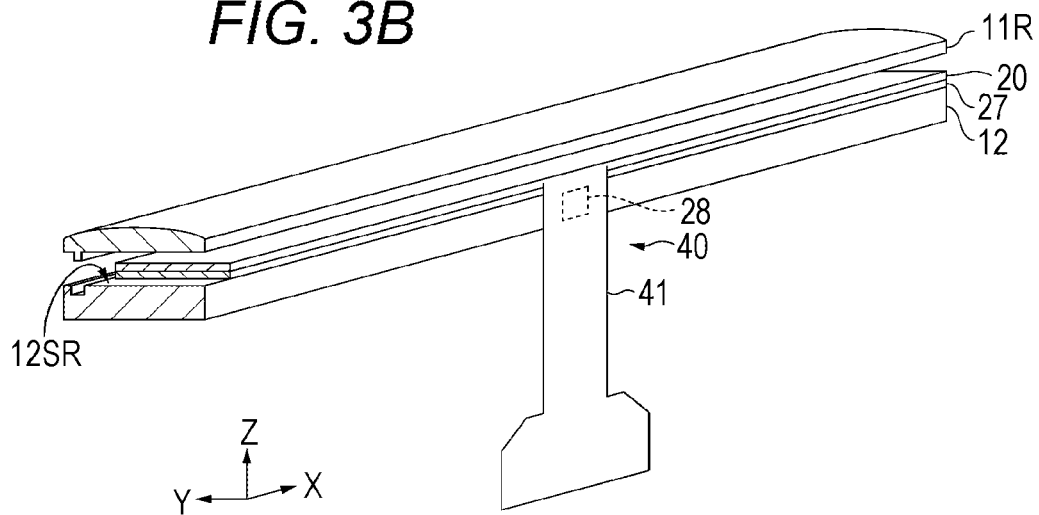
FIG. 3B is a perspective view illustrating the arrangement form of the sensor.

As illustrated in FIG. 3B, the sensor 20 on the sidewall 11R side is attached to the support face 12SR of the frame 12 via an adhesive layer 27. The sensor 20 on the sidewall 11L side is also attached to the support face 12SL like the sensor 20 of the sidewall 11R. Furthermore, a noise is generated when a force is applied to the FPC 40, so that the connecting portion 41 is preferably attached to the frame 12 via an adhesive layer 28.

Figure 4:
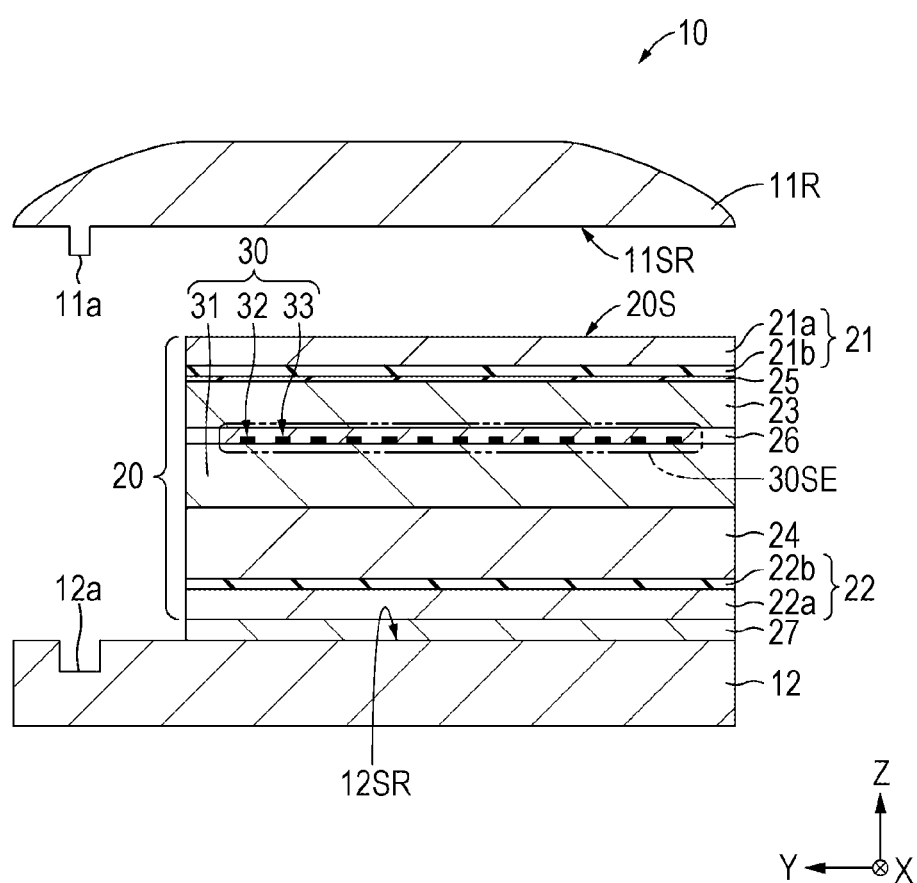
FIG. 4 is a cross-sectional view illustrating the configuration of the sensor.

The sensor 20 is a so-called pressure-sensitive sensor, and as illustrated in FIG. 4, includes the electrostatic-capacity-type sensor electrode unit 30, electrode bases 21 and 22, deformable layers 23 and 24, and adhesive layers 25 to 27. The back faces of the sensors 20 are attached to the support faces 12SR and 12SL. Note that, in the present specification, the longitudinal direction of the sensor 20 is referred to as the ±X-axis direction, the width direction (lateral direction) is referred to as the ±Y-axis direction, and a direction perpendicular to the longitudinal direction and the width direction (that is a direction perpendicular to the sensing face 20S) is referred to as the ±Z-axis direction.

The electrode base 21 and the sensor electrode unit 30 are disposed such that a main face of the electrode base 21 is opposed to a main face of the sensor electrode unit 30. The deformable layer 23 is provided between the main face of the electrode base 21 and the first main face of the sensor electrode unit 30, and elastically deformed due to a pressure applied to the sensing face 20S. The deformable layer 23 is attached to the electrode base 21 with the adhesive layer 25, and the deformable layer 23 is attached to the sensor electrode unit 30 with the adhesive layer 26.

The electrode base 22 and the sensor electrode unit 30 are disposed such that a main face of the electrode base 22 is opposed to a main face of the sensor electrode unit 30. The deformable layer 24 is provided between the electrode base 22 and the sensor electrode unit 30, and elastically deformed due to a pressure applied to the sensing face 20S. The deformable layer 24 includes an adhesive material, also functions as an adhesive layer, and the electrode base 22 is attached to the sensor electrode unit 30 with the deformable layer 24.

(Sensor Electrode Unit)

As described above, the sensor electrode unit 30 has the elongated rectangular shape and is part of the FPC 40. Thus, the sensor electrode unit 30 is provided as part of the FPC 40, and the number of parts can be reduced. Furthermore, the impact durability of the connection between the sensor 20 and the substrate 13 can be improved. As illustrated in FIG. 5, the FPC 40 includes the sensor electrode unit 30, and the connecting portion 41 extending from the center of the long side of the sensor electrode unit 30.

Figure 6:
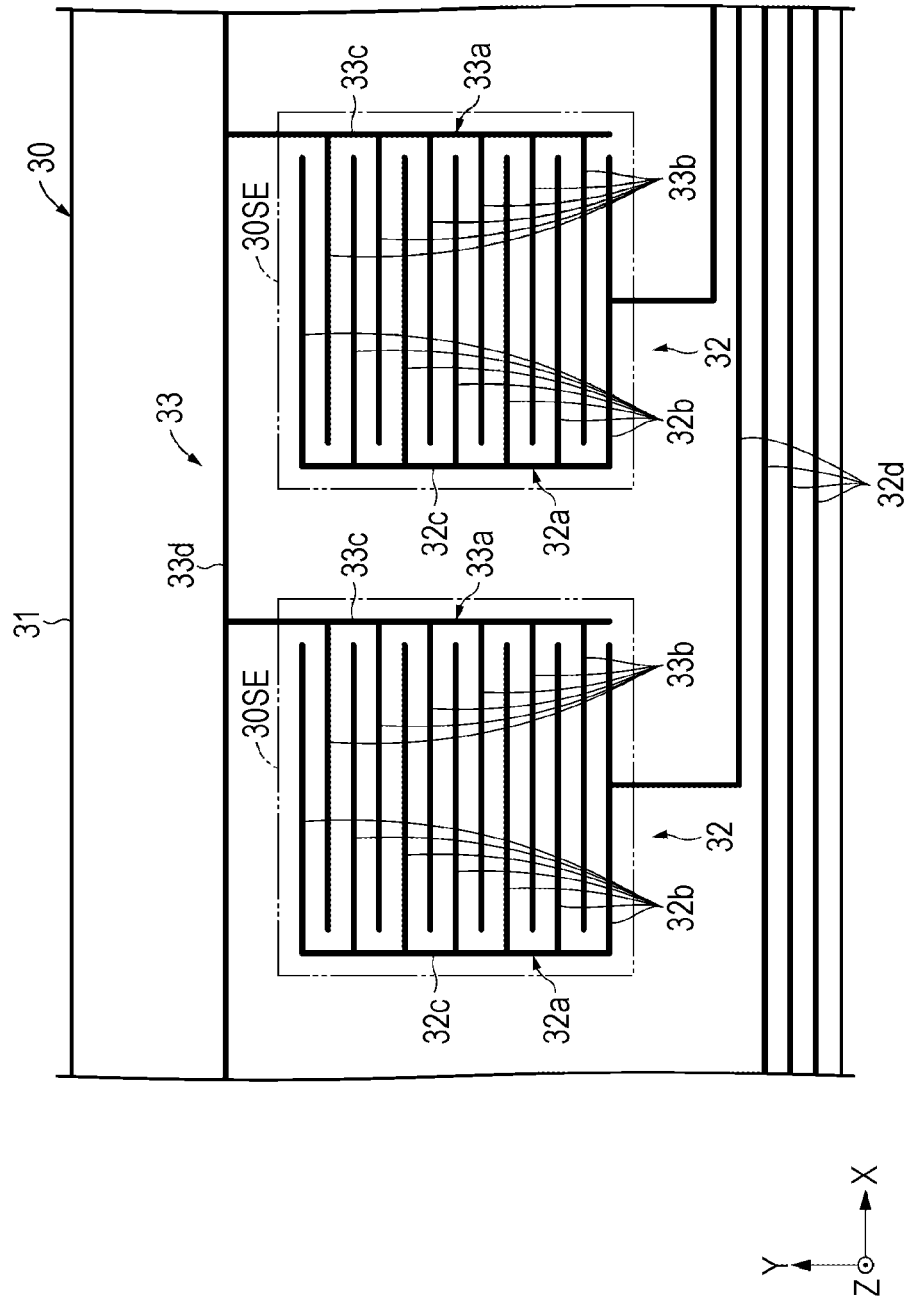
FIG. 6 is a plan view illustrating the configuration of a sensing unit.

As illustrated in FIGS. 5 and 6, the sensor electrode unit 30 includes a plurality of pulse electrodes 32, two sense electrodes 33, one ground electrode 34a provided on one main face of a flexible base 31, and one ground electrode 34b provided on the other face of the base 31. The pulse electrodes 32 and the sense electrodes 33 are included in a sensing unit 30SE. With a plurality of sensing units 30SE in plan view in the Z-axis direction, the plurality of sensing units 30SE is one-dimensionally disposed forming one array at equal intervals in the X-axis direction.

The connecting portion 41 includes wirings 32d and 33e provided on the one main face of the base 31, and a connection terminal 42. The wiring 32d electrically connects the pulse electrodes 32 and the ground electrodes 34a and 34b of the sensor electrode unit 30 to the connection terminal 42 provided at the leading end of the connecting portion 41. The wiring 33e electrically connects the sense electrodes 33 of the sensor electrode unit 30 to the connection terminal 42 provided at the leading end of the connecting portion 41. The connection terminal 42 is electrically connected to the substrate 13.

The FPC 40 may further include an insulating layer (not illustrated) such as a coverlay film covering the pulse electrodes 32, the sense electrodes 33, and the wirings 32d and 33e, on the one main face of the base 31.

The base 31 is a flexible substrate including a polymer resin. Examples of the polymer resin include: polyethylene terephthalate (PET); polyethylene naphthalate (PEN); polycarbonate (PC); acrylic resin (PMMA); polyimide (PI); triacetylcellulose (TAC); polyester; polyamide (PA); aramid; polyethylene (PE); polyacrylate; polyether sulfone; polysulfone; polypropylene (PP); diacetyl cellulose; polyvinyl chloride; epoxy resin; urea-formaldehyde resin; urethane resin; melamine resin; cyclic olefin polymer (COP); or thermoplastic norbornene-based resin and the like.

As illustrated in FIG. 6, the pulse electrode 32 as a first electrode includes one unit electrode body 32a. The respective unit electrode bodies 32a included in the plurality of pulse electrodes 32 are one-dimensionally disposed forming one array at a constant interval in the X-axis direction. As illustrated in FIG. 6, the sense electrode 33 as a second electrode includes a plurality of unit electrode bodies 33a and one connection portion 33d. The plurality of unit electrode bodies 33a is one-dimensionally disposed forming one array at constant intervals in the X-axis direction, and the unit electrode bodies 33a adjacent to each other are connected by the connection portion 33d.

The wiring 32d is drawn out from each pulse electrode 32, routed around the peripheral portion of the first main face of the base 31, and connected to the connection terminal 42 through the connecting portion 41. The wiring 33e is drawn out from each sense electrode 33, routed around the peripheral portion of the first main face of the base 31, and connected to the connection terminal 42 through the connecting portion 41.

The unit electrode bodies 32a and 33a each having a comb-teeth shape, are disposed such that the respective comb teeth portions interdigitate with each other. Specifically, the unit electrode body 32a includes a plurality of linear sub-electrodes 32b and a linear coupling portion 32c. The unit electrode body 33a includes a plurality of linear sub-electrodes 33b and a linear coupling portion 33c. The plurality of sub-electrodes 32b and the plurality of sub-electrodes 33b extend in the X-axis direction and are alternately spaced apart from each other at predetermined intervals in the Y-axis direction. The sub-electrodes 32b and 33b adjacent to each other are capable of forming capacitive coupling.

The coupling portion 32c extends in the Y-axis direction, and connects one ends of the plurality of sub-electrodes 32b. The coupling portion 33c extends in the Y-axis direction, and connects the other ends of the plurality of sub-electrodes 33b. The interval between the sub-electrodes 32b and 33b may be constant or may vary. The sensing unit 30SE includes the unit electrode bodies 32a and 33a that are disposed interdigitating with each other.

(Electrode Base)

The electrode bases 21 and 22 are flexible electrode films. The electrode base 21 forms the sensing face 20S of the sensor 20, and the electrode base 22 forms the back face of the sensor 20. From the viewpoint of improving the responsiveness of the sensor 20 at gradual loading, the electrode base 21 is preferably 50 μm or more, more preferably 100 μm or more. From the viewpoint of suppressing an increase in the thickness of the sensor 20, the electrode base 21 is preferably 300 μm or less, more preferably 250 μm or less.

The electrode base 21 includes a flexible base 21a and a reference electrode layer (hereinafter referred to as "REF electrode layer") 21b provided on one main face of the base 21a. The electrode base 21 is disposed on the first main face side of the sensor electrode unit 30 such that the REF electrode layer 21b is opposed to the one main face of the sensor electrode unit 30. The electrode base 22 includes a flexible base 22a and an REF electrode layer 22b provided on one main face of the base 22a. The electrode base 22 is disposed on the other main face side of the sensor electrode unit 30 such that the REF electrode layer 22b is opposed to the other main face of the sensor electrode unit 30.

The bases 21a and 22a have a film shape. As the material of the bases 21a and 22a, a polymer resin similar to that of the base 31 described above is exemplified. The REF electrode layers 21b and 22b are so-called ground electrodes and have a ground potential. Examples of the shape of the REF electrode layers 21b and 22b include a thin film shape, a foil shape, a mesh shape, and the like, but are not limited thereto.

The REF electrode layers 21b and 22b may be a layer having electric conductivity, and an inorganic conductive layer containing an inorganic conductive material, an organic conductive layer containing an organic conductive material, and an inorganic-organic conductive layer containing both of the inorganic conductive material and the organic conductive materials, or the like can be used, for example. The inorganic conductive material and the organic conductive material may be particles.

Examples of the inorganic conductive material include a metal, a metal oxide, and the like. Here, the metal is defined as including a semimetal. Examples of the metal include a metal such as aluminum; copper; silver; gold; platinum; palladium; nickel; tin; cobalt; rhodium; iridium; iron; ruthenium; osmium; manganese; molybdenum; tungsten; niobium; tantalum; titanium; bismuth; antimony; and lead, and an alloy thereof or the like, but are not limited thereto. Specific examples of the alloy include: stainless used steel (SUS); aluminum alloy; magnesium alloy, titanium alloy, and the like. Examples of the metal oxide include, but are not limited to, indium tin oxide (ITO); zinc oxide; indium oxide; antimony-added tin oxide; fluorine-added tin oxide; aluminum-added zinc oxide; gallium-added zinc oxide; silicon-doped zinc oxide; zinc oxide- tin oxide based; indium oxide-tin oxide based; zinc oxide-indium oxide-magnesium oxide based; and the like.

Examples of the organic conductive material include a carbon material, a conductive polymer, and the like. Examples of the carbon material include, but are not limited to, carbon black; carbon fiber; fullerene; graphene; carbon nanotube; carbon microcoil; nanohorn; and the like. As the conductive polymer, for example, a substituted or unsubstituted polyaniline; polypyrrole; polythiophene; a (co) polymer containing one or two selected from these; or the like can be used; however, the conductive polymer is not limited thereto.

The REF electrode layers 21b and 22b may be thin films prepared through either a dry process or a wet process. As the dry process, for example, a sputtering method, an evaporation method, or the like can be used; however, the dry process is not particularly limited thereto.

The electrode base 21 is provided on the one main face side of the sensor electrode unit 30 and the electrode base 22 is provided on the other main face side of the sensor electrode unit 30. Thus, an external noise (external electric field) can be prevented from entering the sensor electrode unit 30 from both main face sides of the sensor 20. Therefore, degradation of the detection accuracy or false detection of the sensor 20 due to the external noise can be suppressed.

(Deformable Layer)

The deformable layer 23 is a film elastically deformed due to a pressure applied to the sensing face 20S of the sensor 20. In the sensor 20, the soft deformable layer 23 that is elastically deformable is interposed between the first main face of the sensor electrode unit 30 and the main face of the electrode base 21, whereby the sensitivity and the dynamic range of the sensor 20 are adjusted. The deformable layer 23 preferably has a hole (not illustrated) such as a through hole. This is because the load sensitivity can be improved.

The deformable layer 23 includes a dielectric such as a foamed resin or an insulating elastomer. The foamed resin is a so-called sponge, for example, which is at least one of foamed polyurethane (polyurethane foam), foamed polyethylene (polyethylene foam), foamed polyolefin (polyolefin foam), foamed acrylic (acrylic foam), sponge rubber, or the like. The insulating elastomer is, for example, at least one of a silicone-based elastomer, an acrylic-based elastomer, a urethane-based elastomer, a styrene-based elastomer, or the like. Note that the deformable layer 23 may be provided on a base (not illustrated).

The deformable layer 24 includes an adhesive or a double-sided adhesive tape, having insulative properties. As the adhesive, for example, one or more selected from the group consisting of an acrylic-based adhesives, a silicone-based adhesive, a urethane-based adhesive, and the like can be used. Here, pressure sensitive adhesion is defined as a type of adhesion. According to this definition, a pressure-sensitive adhesive layer is regarded as a type of adhesive layer. Although including the adhesive or the double-sided adhesive tape, the deformable layer 24 is thicker than the adhesive layers 25 to 27 and functions as a good deformable layer. Note that the deformable layer 24 may include a material similar to that of the deformable layer 23.

It is preferable to suppress residual strain generated in the deformable layer 23 due to the deformation of the sensor 20 by pressing with an assumed load and during an assumed time. In order to suppress such residual strain, at least one of the following configurations (1), (2), or (3) is preferably adopted. In other words, (1) a material having high rigidity is used as the electrode base 21, so that the amount of deformation of the deformable layer 23 due to the assumed load is suppressed. (2) The thickness of the deformable layer 23 is made sufficiently thick for the amount of deformation due to the assumed load. (3) Twenty five percent compression-load-deflection (CLD) for the deformable layer 23 is set at 20 kPa or less.

From the viewpoint of improving the responsiveness of the sensor 20 at gradual loading, the thickness of the deformable layer 23 is preferably 180 μm or more, more preferably 200 μm or more, and still more preferably 220 μm or more. From the viewpoint of suppressing an increase in the thickness of the sensor 20, the thickness of the deformable layer 23 is preferably 300 μm or less, more preferably 250 μm or less.

From the viewpoint of improving the responsiveness of the sensor 20 at gradual loading, the 25% CLD for the deformable layer 23 is preferably 36 kPa or less, more preferably 20 kPa or less, still more preferably 15 kPa or less, particularly preferably 10 kPa or less. The upper limit value of the 25% CLD for the deformable layer 23 is not particularly limited; however, the upper limit value is preferably 1 kPa or more, more preferably 5 kPa or more, considering the manufacturability. Here, the 25% CLD for the deformable layer 23 is a value obtained in accordance with a test method in JIS K 6254.

From the viewpoint of improving the responsiveness of the sensor 20 at gradual loading, the density of the deformable layer 23 is preferably 320 kg/m$^3$ or less, more preferably 250 kg/m$^3$ or less, still more preferably 200 kg/m$^3$ or less. The upper limit value of the density of the deformable layer 23 is not particularly limited; however, the upper limit is preferably 10 kg/m$^3$ or more, more preferably 100 kg/m$^3$ or more, considering the manufacturability. The density of the deformable layer 23 is a value determined in accordance with a test method in JIS K 6401.

(Adhesive Layer)

The adhesive layers 25 to 27 include, for example, an adhesive or a double-sided adhesive tape, having insulative properties. As the adhesive, an adhesive similar to that of the above-described deformable layer 24 can be exemplified.

[Circuit Configuration of Electronic Apparatus]

Figure 7:
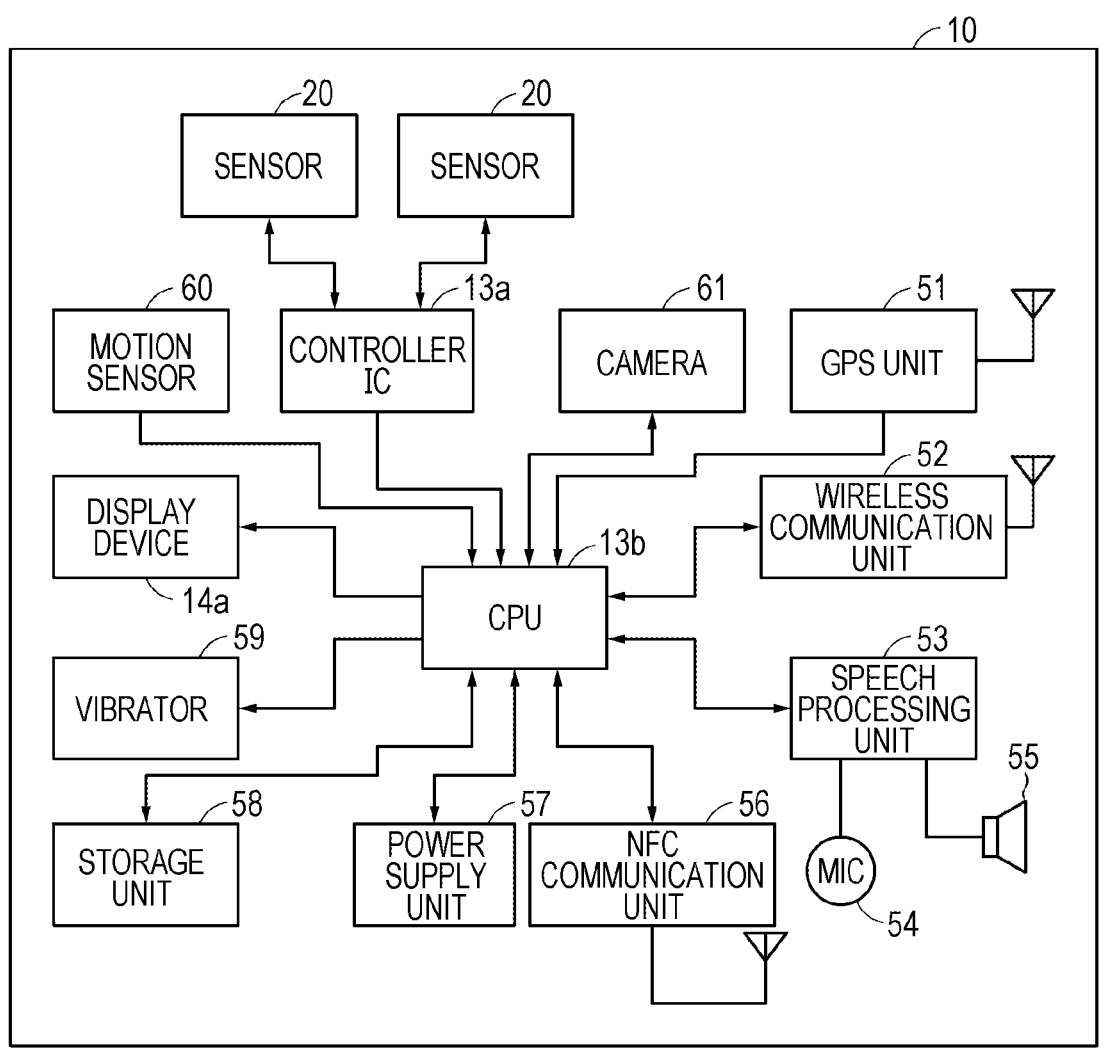
FIG. 7 is a block diagram illustrating the circuit configuration of the electronic apparatus according to the first embodiment of the present technology.

As illustrated in FIG. 7, the electronic apparatus 10 includes: the two sensors 20; the CPU 13*b*; the IC 13*a*; a global positioning system (GPS) unit 51; a wireless communication unit 52; a speech processing unit 53; a microphone 54; a speaker 55; a near field communication (NFC) communication unit 56; a power supply unit 57; a storage unit 58; a vibrator 59; the display device 14*a*; a motion sensor 60; and a camera 61.

The GPS unit 51 is a positioning unit that receives a radio wave from a satellite of a system called global positioning system (GPS) and performs positioning of the current position. The wireless communication unit 52 performs near field communication with other terminals under the Bluetooth (registered trademark) standard, for example. The NFC communication unit 56 performs wireless communication with a close reader/writer under the near field communication (NFC) standard. Data obtained by the GPS unit 51, the wireless communication unit 52, and the NFC communication unit 56 is supplied to the CPU 13*b*.

The microphone 54 and the speaker 55 are connected to the speech processing unit 53, and the speech processing unit 53 performs processing of a call with a party connected by wireless communication at the wireless communication unit 52. Furthermore, the speech processing unit 53 is also capable of performing processing for a speech input operation.

The power supply unit 57 supplies power to the CPU 13*b*, the display device 14*a*, and the like provided in the electronic apparatus 10. The power supply unit 57 includes a secondary battery such as a lithium ion secondary battery, a charge and discharge control circuit that controls charging and discharging of the secondary battery, and the like. Note that, although not illustrated in FIG. 7, the electronic apparatus 10 includes a terminal for charging the secondary battery.

The storage unit 58 is a random access memory (RAM) or the like, and stores various types of data such as an operating system (OS), an application, a moving image, an image, music, and a document.

The vibrator 59 is a member that vibrates the electronic apparatus 10. For example, the vibrator 59 vibrates the electronic apparatus 10 and the electronic apparatus 10 issues a notification for reception of a telephone call, e-mail reception, or the like.

The display device 14*a* displays various screens on the basis of a picture signal or the like supplied from the CPU 13*b*. Furthermore, a signal corresponding to a touch operation on a display face of the display device 14*a* is supplied to the CPU 13*b*.

The motion sensor 60 detects a movement of the user holding the electronic apparatus 10. As the motion sensor 60, an accelerometer, a gyro sensor, an electronic compass, a barometric pressure sensor, or the like is used.

The camera 61 includes an imaging element such as a lens group and a complementary metal oxide semiconductor (CMOS), and captures an image such as a still image or a moving image under the control of the CPU 13*b*. The captured still image, moving image, and the like are stored in the storage unit 58.

The sensor 20 is a pressure sensor with high sensitivity and high position resolution, detects electrostatic capacity corresponding to a pressing operation on the sensing face 20S, and outputs an output signal corresponding to the electrostatic capacity to the IC 13*a*.

The IC 13*a* stores firmware for controlling the sensor 20, detects a change in electrostatic capacity (pressure) of the respective sensing units 30SE of the sensor 20, and outputs a signal corresponding to the result to the CPU 13*b*.

The CPU 13*b* executes various types of processing based on a signal supplied from the IC 13*a*. Furthermore, the CPU 13*b* processes data supplied from the GPS unit 51, the wireless communication unit 52, the NFC communication unit 56, the motion sensor 60, and the like.

[Each Region of Electronic Apparatus]

Figure 8:
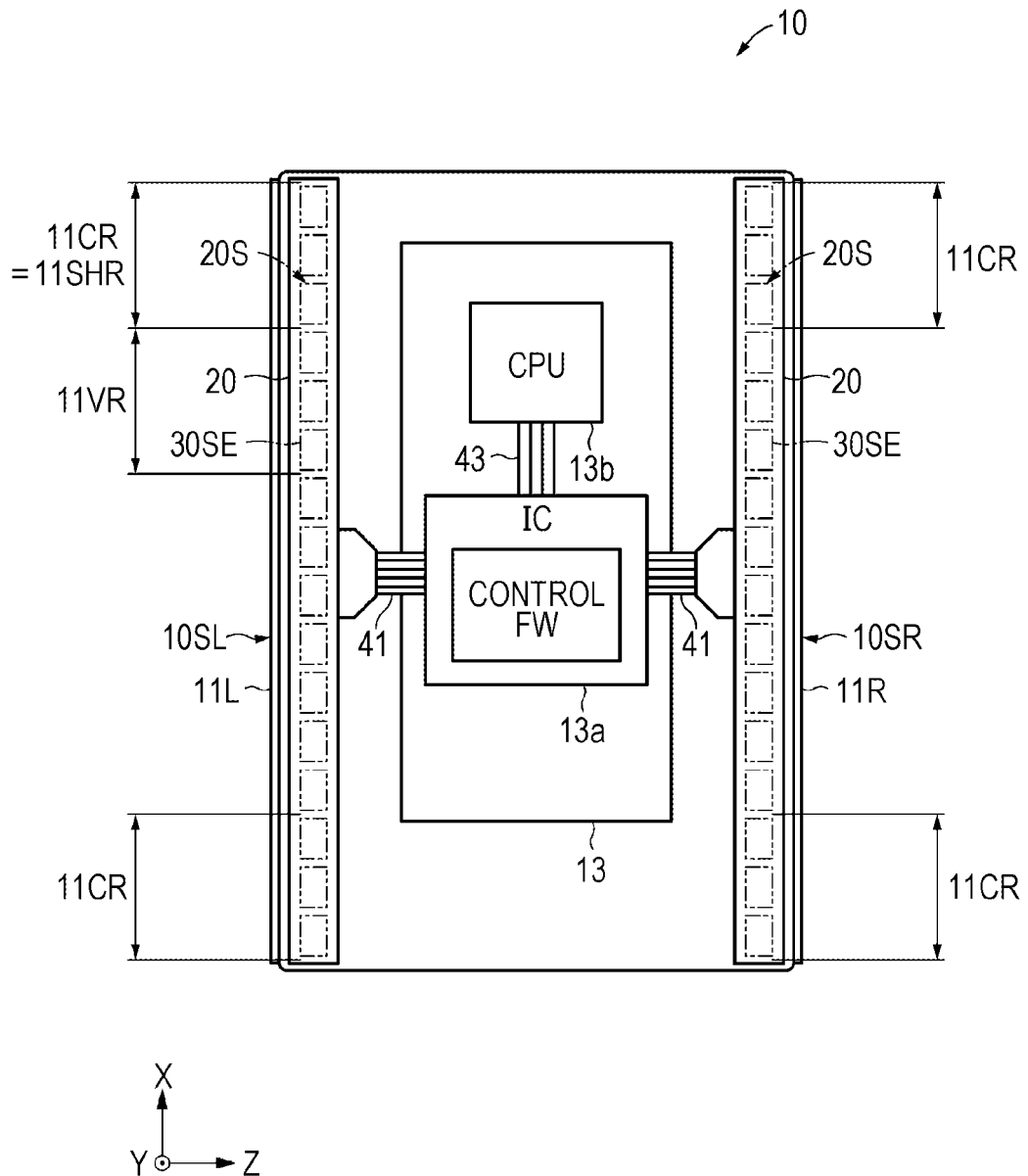
FIG. 8 is a schematic view for describing each region of the electronic apparatus according to the first embodiment of the present technology.

As illustrated in FIG. 8, the sensors 20 are connected to the IC 13*a* via the connecting portions 41. The IC 13*a* and the CPU 13*b* are connected with a bus such as I$^2$C. In FIG. 8, a case where the sensors 20 each have sixteen sensing units 30SE is illustrated. However, the number of the sensing units 30SE is not limited thereto, and can be set appropriately in accordance with the desired characteristics of the sensor 20. Furthermore, in order to make the configuration of the sensor 20 easy to understand, the sensing face 20S is illustrated being parallel to the X-Z plane; however, actually the sensing face 20S is maintained parallel to the X-Y plane.

(Sound Volume Adjustment Region)

The electronic apparatus 10 has a sound volume adjustment region 11VR for adjusting a sound volume, on the side face 10SL. Sliding the sound volume adjustment region 11VR in the upward direction (first direction) with a finger can raise the sound volume. Sliding the sound volume adjustment region 11VR in the downward direction (second direction) with a finger can reduce the sound volume. Here, the upward direction means the +X-axis direction, and the downward direction means the −X-axis direction. Note that the sound volume adjustment region 11VR is an example of a slide operation region.

Note that the position of the volume adjustment region 11VR illustrated in FIG. 8 is an example, and the position of the sound volume adjustment region 11VR is not limited thereto. Furthermore, FIG. 8 illustrates the configuration in which the electronic apparatus 10 includes the sound volume adjustment region 11VR only on the side face 10SL. However, the sound volume adjustment region 11VR may be included on both of the side faces 10SR and 10SL.

The sound volume adjustment region 11VR has two or more sensing units 30SE. On the basis of a signal supplied from the sensing unit 30SE of the sound volume adjustment region 11VR, the IC 13a determines whether or not the slide operation has been performed in the upward direction or in the downward direction in the volume adjustment region 11VR. In a case where it is determined that the slide operation has been performed in the upward direction or the downward direction, the IC 13a supplies, to the CPU 13b, a signal notifying that the slide operation has been performed in the upward direction or the downward direction.

(Camera Holding Region)

The electronic apparatus 10 has respective camera holding regions 11CR at both ends of each of the side faces 10SR and 10SL. When the user holds the four camera holding regions 11CR with the fingers, a camera application is automatically started. The camera holding region 11CR has at least one sensing unit 30SE.

On the basis of a signal supplied from the sensing unit 30SE of each camera holding region 11CR, the IC 13a determines whether or not the user has held the four camera holding regions 11CR with the fingers. In a case where it is determined that the four camera holding regions 11CR have been held with the fingers, the IC 13a supplies a signal requesting starting of the camera application to the CPU 13b.

(Shutter Operation Region)

The electronic apparatus 10 has a shutter operation region 11SHR at one end in the upward direction of the side face 10SL. Note that, in FIG. 8, the case where the shutter operation region 11SHR and one of the four camera holding regions 11CR are the same regions is illustrated; however, the regions may be different from each other.

On the basis of a signal supplied from the sensing unit 30SE of the shutter operation region 11SHR, the IC 13a determines whether or not the shutter operation region 11SHR has been pressed with a finger. In a case where it is determined that the shutter operation region 11SHR has been pressed with the finger, the IC 13a supplies a signal requesting a shutter operation (that is, an image capturing operation) to the CPU 13b.

[Operation of Sensor]

Next, the operation of the sensor 20 according to the first embodiment of the present technology will be described. When the IC 13a applies a voltage between the pulse electrodes 32 and the sense electrodes 33, that is, between the sub-electrodes 32b and 33b, electric lines of force (capacitive coupling) are formed between the sub-electrodes 32b and 33b.

When the sensing face 20S of the sensor 20 is pressed, the deformable layers 23 and 24 are elastically deformed, the electrode base 21 bends to the sensor electrode unit 30, and the sensor electrode unit 30 bends to the electrode base 22. As a result, the electrode base 21 and the sensor electrode unit 30 come close to each other, and the sensor electrode unit 30 and the electrode base 22 come close to each other. Thus, part of the electric lines of force between the sub-electrodes 32b and 33b flows into the electrode bases 21 and 22 to change the electrostatic capacity of the sensing unit 30SE. The IC 13a detects a pressure applied to one main face of the sensor 20 on the basis of the change in the electrostatic capacity, and outputs the result to the CPU 13b.

[Operation of Electronic Apparatus]

Next, the operation of the electronic apparatus 10 in (1) wake-up operation, (2) slide operation, (3) automatic startup operation for the camera application, and (4) right/left hand detection function will be sequentially described.

(1) Wake-Up Operation

The wake-up operation is an operation in which the user grips the electronic apparatus 10 in a sleeping mode, whereby the CPU 13b returns from the sleeping mode and drives the display device 14a. Specific examples of the wake-up operation include an example in which the user picks up the electronic apparatus 10 in the sleeping mode placed on a desk and grips the electronic apparatus 10, whereby a screen of the display device 14a is displayed.

Figure 9:
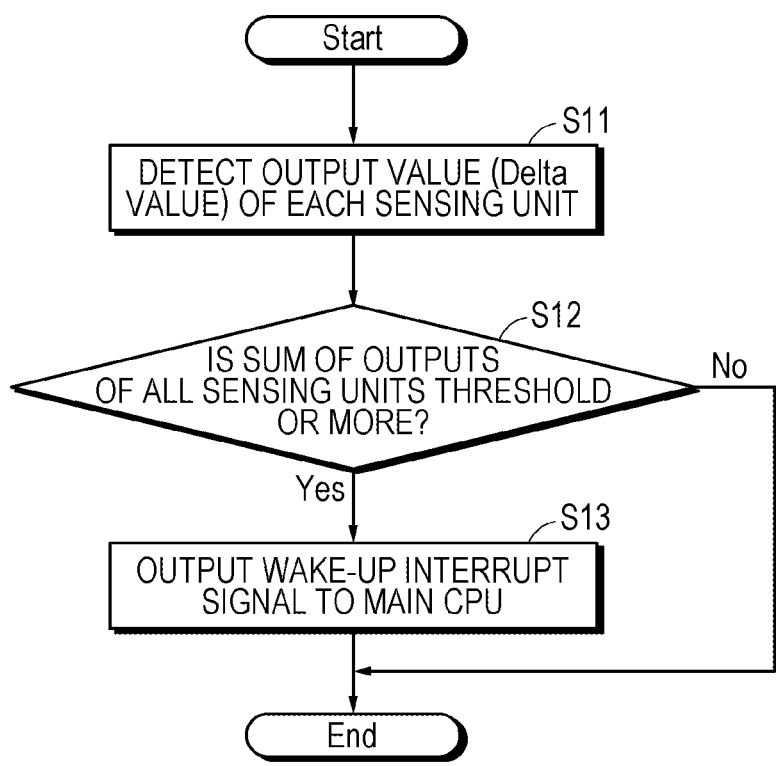
FIG. 9 is a flowchart for describing the operation of the electronic apparatus during a wake-up operation.

Hereinafter, with reference to FIG. 9, the operation of the electronic apparatus 10 during the wake-up operation will be described. Here, it is assumed that the CPU 13b is in the sleeping mode before step S11, and the processing illustrated in FIG. 9 is executed within one frame, for example. Note that the frame means continuous processing or the period of time from performing a scanning operation for the sensor 20 connected to the IC 13a, obtaining a pressure distribution (electrostatic capacity distribution) through signal processing, interpreting an input operation performed by the user on the basis of the result (in some cases, with a time-oriented change in a pressure distribution among a plurality of past frames), to outputting, as necessary, the details of the input operation performed by the user to a host control unit (here, the CPU 13b). Normally, the IC 13a repeats this frame processing at predetermined time intervals, thereby interpreting the user's input operation and outputting the details to the CPU 13b.

First, in step S11, the IC 13a detects an output value (delta value) of each sensing unit 30SE. Next, in step S12, the IC 13a determines whether or not the sum of the output values of all the sensing units 30SE is a threshold or more.

In a case where it is determined in step S12 that the sum of the output values of all the sensing units 30SE is the threshold or more, in step S13, the IC 13a outputs a wake-up interrupt signal to the CPU 13b. The wake-up interrupt signal is a signal for causing the CPU 13b to execute a wake-up function. When the wake-up interrupt signal is supplied from the IC 13a to the CPU 13b, the CPU 13b wakes up from the sleeping mode and returns to a normal start sate. On the other hand, in a case where it is determined in step S12 that the sum of the output values of all the sensing units 30SE is not the threshold or more, the process is terminated.

(2) Slide Operation

The slide operation is an operation of adjusting the sound volume of the electronic apparatus 10 by sliding, in the vertical direction, the sound volume adjustment region 11VR provided on the side face 10SL with the finger.

Figure 10:
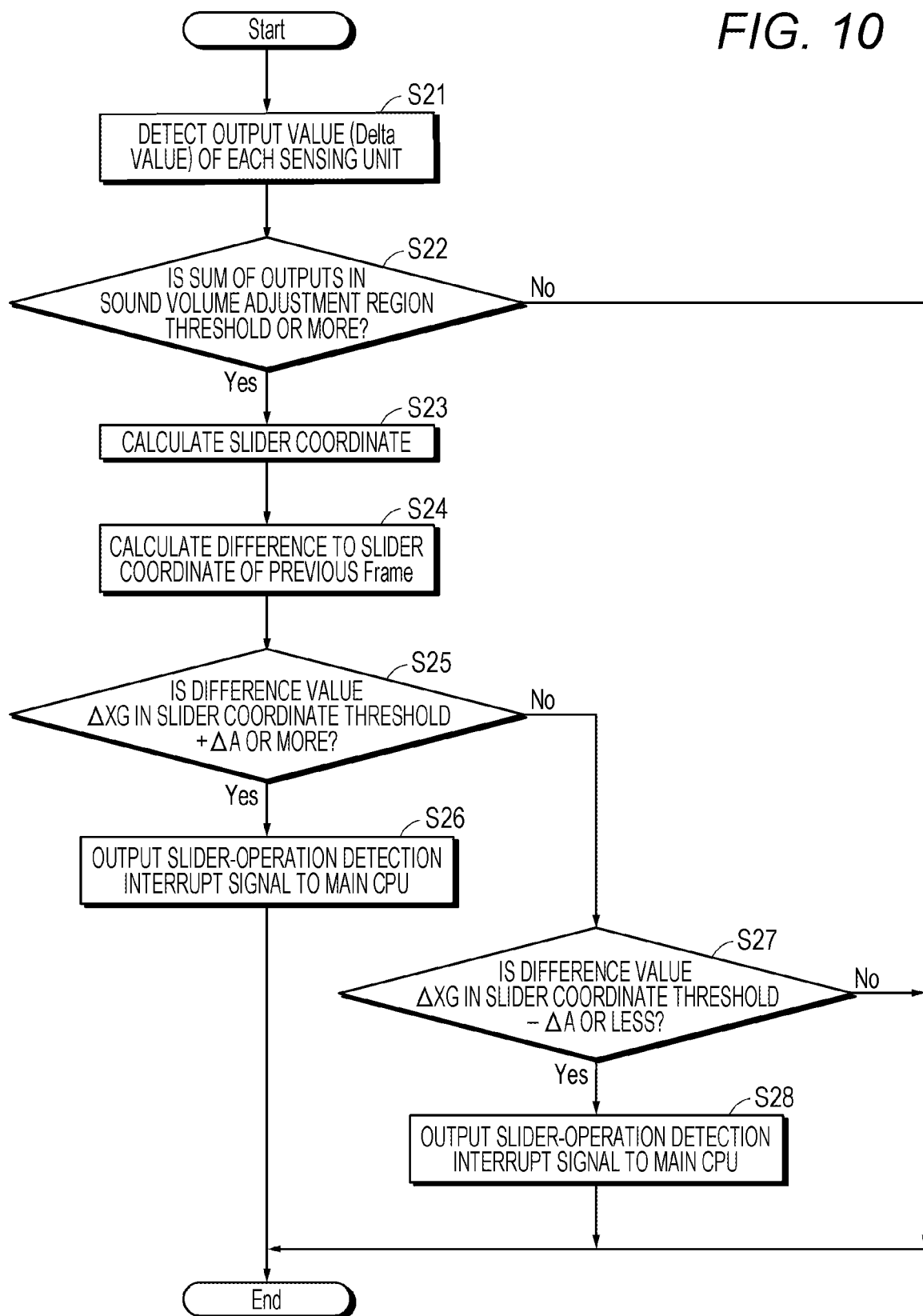
FIG. 10 is a flowchart for describing the operation of the electronic apparatus during a slide operation.

Hereinafter, with reference to FIG. 10, the operation of the electronic apparatus 10 during the slide operation will be described. Here, the slide operation is an operation that can be performed, for example, with a home screen displayed, and it is assumed that the processing illustrated in FIG. 10 is executed within one frame, for example.

First, in step S21, the IC 13a detects an output value (delta value) of each sensing unit 30SE. Next, in step S22, the IC 13a determines whether or not the sum of the output values of all the sensing units 30SE included in the sound volume adjustment region 11VR is a threshold or more.

In a case where it is determined in step S22 that the sum of the output values of all the sensing units 30SE included in the sound volume adjustment region 11VR is the threshold or more, in step S23, the IC 13a calculates a barycentric coordinate $X_G$ (hereinafter referred to as "slider coordinate $X_G$") of a sliding finger. Specifically, a barycentric value of the output value of each sensing unit 30SE (the plurality of sensing units 30SE in succession) included in the sound volume adjustment region 11VR is calculated with the following Expression (1). On the other hand, in a case where it is determined in step S22 that the sum of the output values of all the sensing units 30SE included in the sound volume adjustment region 11VR is not the threshold or more, the process is terminated.

[Mathematical Formula 1]
$$x_G = \frac{\sum_{i=1}^{n} m_i x_i}{\sum_{i=1}^{n} m_i}$$

(where $m_i$: the output value (delta value) of the i-th sensing unit 30SE in the sound volume adjustment region 11VR, $x_i$: the position where the i-th sensing unit 30SE in the sound volume adjustment region 11VR is disposed)

Note that the number of the sensing unit 30SE is assumed to increase from one end to the other end in the longitudinal direction of the side face 10SL (that is, to the +X-axis direction). Furthermore, the origin of the coordinate $x_i$ is defined as the center position of the sound volume adjustment region 11VR in the longitudinal direction (that is, +X-axis direction) of the sensing unit 30SE.

Next, in step S24, the IC 13a calculates a difference $\Delta X_G$ between the slider coordinate $X_G$ calculated in the previous frame and the slider coordinate $X_G$ calculated in the current frame (=(the slider coordinate $X_G$ calculated in the current frame)−(the slider coordinate $X_G$ calculated in the previous frame)). Next, in step S25, the IC 13a determines whether or not the difference value in the slider coordinate $X_G$ between the calculation in the previous frame and the calculation in the current frame is a threshold+$\Delta A$ or more.

In a case where it is determined in step S24 that the difference value in the slider coordinate $X_G$ between the calculation in the previous frame and the calculation in the current frame is the threshold+$\Delta A$ or more, the IC 13a outputs a slider-operation detection interrupt signal to the CPU 13b in step S26.

On the other hand, in a case where it is determined in step S24 that the difference value in the slider coordinate $X_G$ between the calculation in the previous frame and the calculation in the current frame is not the threshold+$\Delta A$ or more, in step S27, the IC 13a determines whether or not the difference value in the slider coordinate $X_G$ between the calculation in the previous frame and the calculation in the current frame is the threshold−$\Delta A$ or less.

In a case where it is determined in step S27 that the difference value in the slider coordinate $X_G$ between the calculation in the previous frame and the calculation in the current frame is the threshold−$\Delta A$ or less, in step S28, the IC 13a outputs the slider-operation detection interrupt signal to the CPU 13b. On the other hand, in a case where it is determined in step S27 that the difference value in the slider coordinate $X_G$ between the calculation in the previous frame and the calculation in the current frame is not the threshold−$\Delta A$ or less, the process is terminated.

Here, the slider-operation detection interrupt signal is a signal for issuing a notification for the detection of the slide operation and the direction of the slide operation to the CPU 13b. When the slider-operation detection interrupt signal is supplied from the IC 13a to the CPU 13b, the CPU 13b adjusts the sound volume in accordance with the direction of the slide operation. Specifically, in a case where the direction of the slide operation is the upward direction (that is, in a case where the difference value in the slider coordinate $X_G$ between the calculation in the previous frame and the calculation in the current frame is the threshold+$\Delta A$ or more), the CPU 13b controls sound volume adjustment so as to increase the sound volume. On the other hand, in a case where the direction of the slide operation is the downward direction (that is, in a case where the difference value in the slider coordinate $X_G$ between the calculation in the previous frame and the calculation in the current frame is the threshold−$\Delta A$ or less), the CPU 13b controls the sound volume adjustment so as to decrease the sound volume.

(3) Automatic startup operation for the camera application

The automatic startup operation for the camera application is an operation in which the camera application is automatically started by holding the four camera holding regions 11CR provided on the side faces 10SR and 10SL with the user's fingers.

Figure 11:
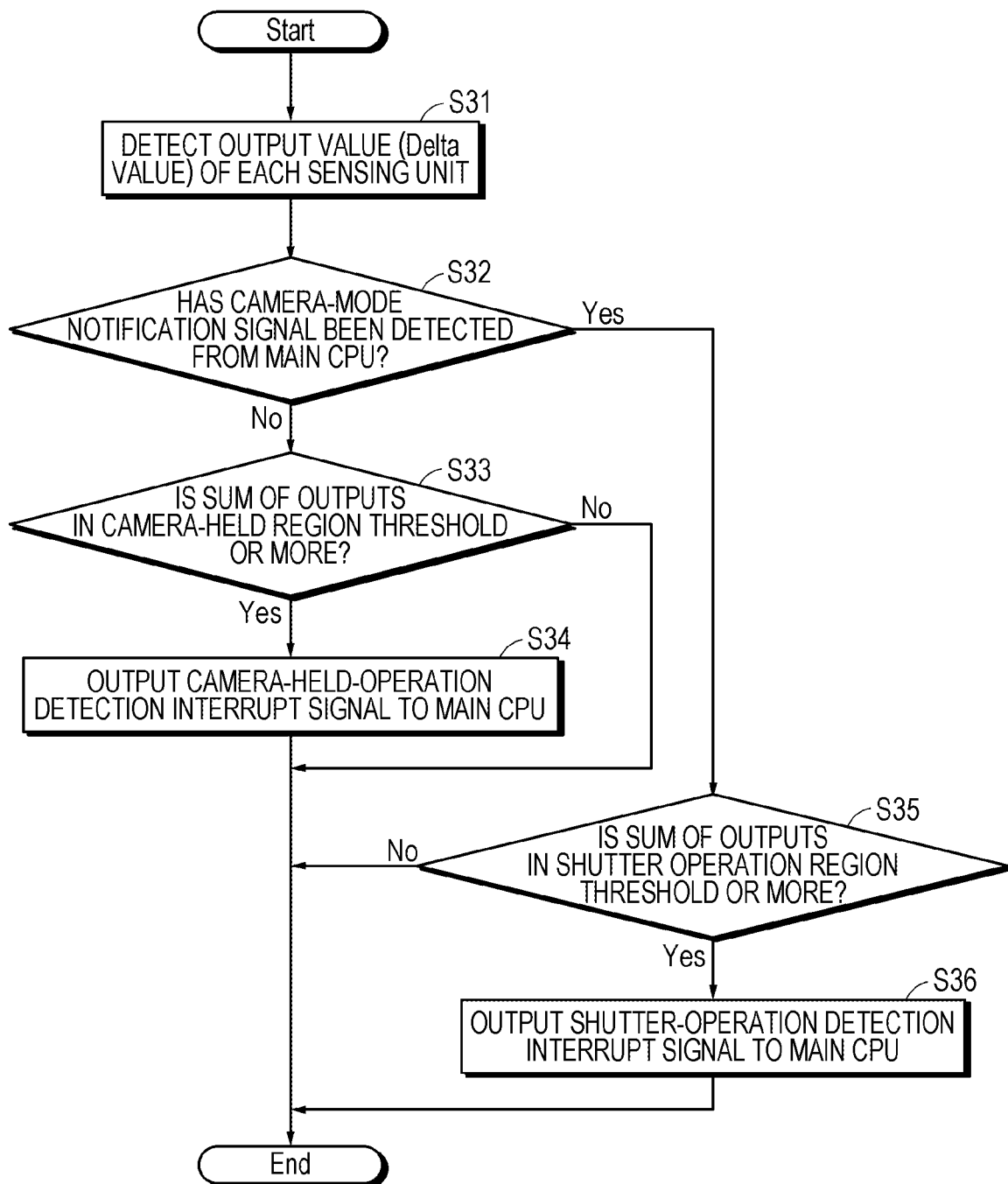
FIG. 11 is a flowchart for describing the operation of the electronic apparatus during an automatic startup operation for a camera application.

Hereinafter, with reference to FIG. 11, the operation of the electronic apparatus 10 during the automatic startup operation for the camera application will be described. Here, the automatic startup operation for the camera application is an operation that can be performed, for example, with the home screen displayed, and it is assumed that the processing illustrated in FIG. 11 is executed within one frame, for example.

First, in step S31, the IC 13a detects an output value (delta value) of each sensing unit 30SE. In this case, the output values of all the sensing units 30SE of the sensor 20 may be detected, but only the output value of the sensing unit 30SE included in the four camera holding regions 11CR may be detected.

Next, in step S32, the IC 13a determines whether or not a signal notifying that a camera mode is in progress (hereinafter referred to as "camera-mode notification signal") has been supplied from the CPU 13b. In a case where it is determined in step S32 that the camera-mode notification signal has not been supplied from the CPU 13b, in step S33, the IC 13a determines whether or not the total value of the outputs of the sensing units 30SE included in the four camera holding regions 11CR is a threshold or more.

In a case where it is determined in step S33 that the total value of the outputs in the four camera holding regions 11CR is the threshold or more, in step S34, the IC 13a outputs the camera-held-operation detection interrupt signal to the CPU 13b. The camera-held-operation detection interrupt signal is a signal for issuing a notification for the start of the camera application to the CPU 13b. When the camera-held-operation detection interrupt signal is supplied from the IC 13a to the CPU 13b, the CPU 13b starts the camera application. On the other hand, in a case where it is determined in step S33 that the total value of the outputs of the four camera holding regions 11CR is not the threshold or more, the process is terminated.

In a case where it is determined in step S32 that the camera-mode notification signal has been supplied from the CPU 13b, in step S35, the IC 13a determines whether or not the total value of the outputs of the sensing units 30SE included in the shutter operation region 11SHR is a threshold or more. Note that in a case where the number of the sensing units 30SE included in the shutter operation region 11SHR is only one, it is determined whether or not the output of the sensing unit 30SE is the threshold or more.

In a case where it is determined in step S35 that the total value of the outputs of the sensing units 30SE included in the shutter operation region 11SHR is the threshold or more, in step S36, the IC 13a outputs a shutter-operation detection interrupt signal to the CPU 13b. The shutter-operation detection interrupt signal is a signal that requests for performing a shutter operation (that is, an image capturing operation) to the CPU 13b. When the shutter-operation detection interrupt signal is supplied from the IC 13a to the CPU 13b, the CPU 13b captures an image and stores the image in the storage unit 58. On the other hand, in a case where it is determined in step S35 that the total value of the outputs of the sensing units 30SE included in the shutter operation region 11SHR is not the threshold or more, the process is terminated.

Note that the electronic apparatus 10 may also perform focus adjustment with the shutter operation region 11SHR. For example, when the shutter operation region 11SHR is half pressed, the focus adjustment may be performed. Specifically, in a case where it is determined that the total value of the outputs of the sensing units 30SE is the threshold 1 or more and less than the threshold 2, the IC 13a outputs a focus-adjustment detection interrupt signal to the CPU 13b. The focus-adjustment detection interrupt signal is a signal for requesting for adjusting the focus of the camera 61 to the CPU 13b. When the focus-adjustment detection interrupt signal is supplied from the IC 13a to the CPU 13b, the CPU 13b adjusts the focus of the camera 61. In a case where it is determined that the total value of the outputs of the sensing units 30SE is the threshold 2 or more, the IC 13a outputs the shutter-operation detection interrupt signal to the CPU 13b.

(4) Right/Left Hand Detection Function

The right/left hand detection function is a function that the IC 13a determines whether the user has held the electronic apparatus 10 with the right hand or the left hand and automatically changes a screen display (for example, application display, operation menu display, or the like) in accordance with the hand holding the electronic apparatus 10. Specifically, in a case where it is determined that the user has held the electronic apparatus 10 with the right hand, a screen for the right hand is displayed, and in a case where it is determined that the user has held the electronic apparatus 10 with the left hand, a screen for the left hand is displayed.

For example, in the case of the application display, the IC 13a automatically changes the screen display as follows. In other words, in a case where the IC 13a determines that the right hand has held the electronic apparatus 10, the IC 13a arranges a menu in a range easily reachable by the thumb of the right hand, or displays the menu shifted from the center position of the screen to the side face 10SR side where the thumb of the right hand positions such that the thumb of the right hand is easily reachable. On the other hand, in a case where the IC 13a determines that the left hand has held the electronic apparatus 10, the IC 13a arranges the menu in a range easily reachable by the thumb of the left hand, or displays the menu shifted from the center position of the screen to the side face 10SL side where the thumb of the left hand positions such that the thumb of the left hand is easily reachable.

Figure 12:
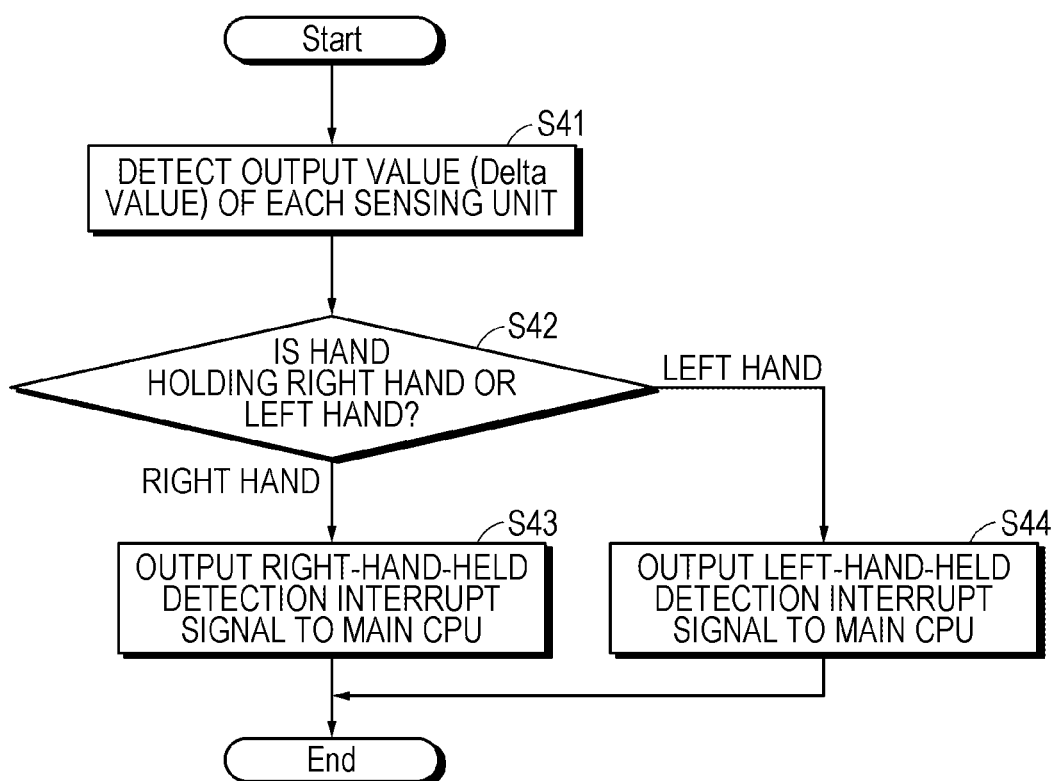
FIG. 12 is a flowchart for describing the operation of the electronic apparatus in a right/left hand detection function.

Hereinafter, with reference to FIG. 12, the operation of the electronic apparatus 10 in the right/left hand detection function will be described. Here, the right/left hand detection function is an operation that can be performed with the home screen or the menu screen, or the like displayed, and it is assumed that the processing illustrated in FIG. 12 is executed within one frame, for example.

Figure 13:
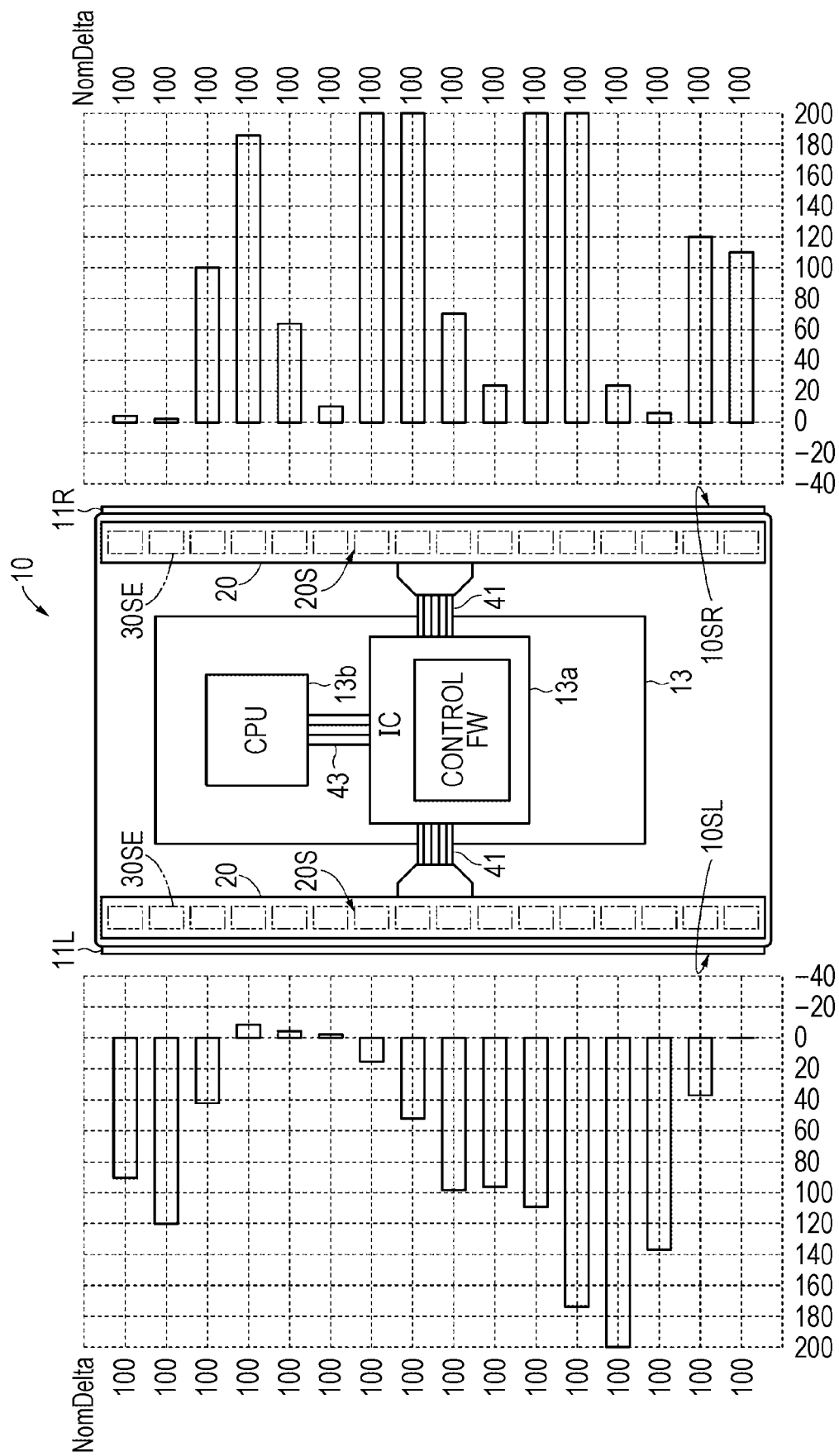
FIG. 13 is a schematic view illustrating an example of a profile of an output value (delta value) when a user holds the electronic apparatus with the left hand.

First, in step S41, the IC 13a detects an output value (delta value) of each sensing unit 30SE. Next, in step S42, the IC 13a determines whether the user has held the electronic apparatus 10 with the right hand or the left hand, on the basis of the output value of each sensing unit 30SE detected in step S41. Specifically, the IC 13a determines the user's hand holding the electronic apparatus 10 from the correlation between the profiles of the output values (delta values) output from all the sensing units 30SE and profiles for the right hand and the left hand prestored in a memory of the IC 13a. FIG. 13 illustrates an example of the profile of the output value (delta value) when the user has held the electronic apparatus 10 with the left hand.

In a case where it is determined in step S42 that the user has held the electronic apparatus 10 with the right hand, in step S43, the IC 13a outputs a right-hand-held detection interrupt signal to the CPU 13b. The right-hand-held detection interrupt signal is a signal that requests for displaying a right-hand-held screen to the CPU 13b. When the right-hand-held detection interrupt signal is supplied from the IC 13a to the CPU 13b, the CPU 13b displays the right-hand-held screen (for example, application display, operation menu display, or the like) is displayed.

On the other hand, in a case where it is determined in S42 that the user has held the electronic apparatus 10 with the left hand, in step S44, the IC 13a outputs a left-hand-held detection interrupt signal to the CPU 13b. The left-hand-held detection interrupt signal is a signal that requests for displaying a left-hand-held screen to the CPU 13b. When the left-hand-held detection interrupt signal is supplied from the IC 13a to the CPU 13b, the CPU 13b displays the left-hand-held screen (for example, application display, operation menu display, or the like) is displayed.

[Effects]

The electronic apparatus 10 according to the first embodiment includes the sidewalls 11R and 11L, the sensors 20 each having the sensing face 20S, and the frame 12 as the support supporting the sensor 20 such that the inner face 11SR of the sidewall 11R is opposed to the sensing face 20S and the inner face 11SL of the sidewall 11L is opposed to the sensing face 20S. When the sidewalls 11R and 11L are pressed against the sensing faces 20S, the sensing faces 20S are pressed by the inner faces 11SR and 11SL. Therefore, the pressing of the side faces 10SR and 10SL of the electronic apparatus 10 can be detected.

Modified Examples

Modified Example of Configuration of Side Face Portion

Figure 14A:
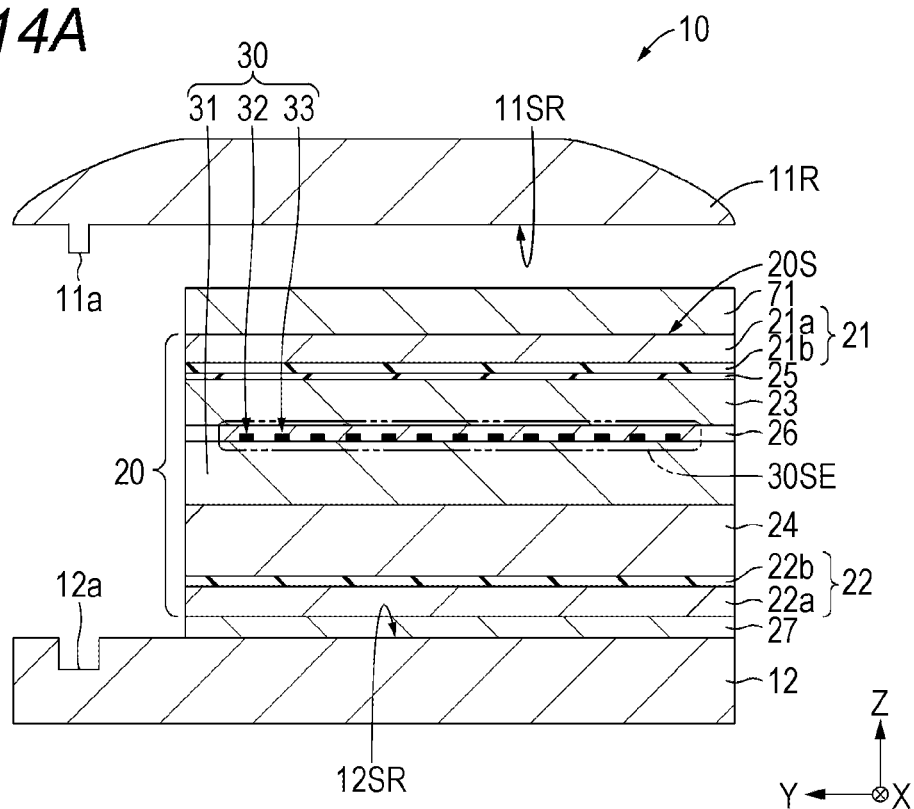
FIGS. 14A and 14B are cross-sectional views each illustrating a modified example of the configuration of a side face portion of the electronic apparatus.

As illustrated in FIG. 14A, the electronic apparatus 10 may further include a sheet-shaped cushioning material 71 between the sensing face 20S and the inner face 11SR. The cushioning material 71 includes a foamed resin. The foamed resin is a so-called sponge, for example, which is at least one of foamed polyurethane, foamed polyethylene, foamed polyolefin, foamed acrylic, sponge rubber, or the like.

The cushioning material 71 may be attached to the sensing face 20S or the inner face 11SR. Furthermore, the electronic apparatus 10 may include two cushioning materials 71, and the cushioning materials 71 may be attached to the sensing face 20S and the inner face 11SR one by one. Note that the shape of the cushioning material 71 is not limited to the sheet shape, and may be a columnar body or the like.

In a case where the cushioning material 71 is further provided as described above, plastic deformation of the sidewall 11R when the electronic apparatus 10 falls or the like can be suppressed. Therefore, the impact durability of the electronic apparatus 10 can be improved. Furthermore, variations in distance between the sensing face 20S and the inner face 11SR during mounting can be suppressed.

Figure 14B:
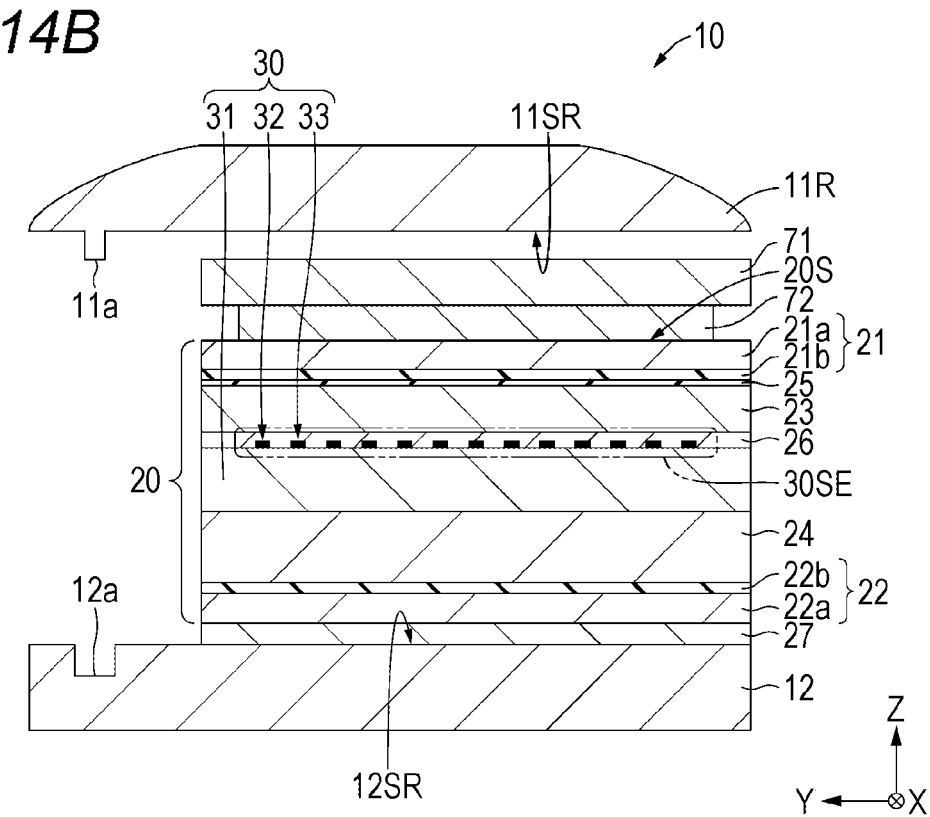

As illustrated in FIG. 14B, the electronic apparatus 10 may further include a pusher 72 as a protrusion on the sensing face 20S. The pusher 72 may be continuously provided or may be discontinuously provided, to the X-axis direction on the sensing face 20S.

In a case where the pusher 72 is continuously provided as described above, the pusher 72 is provided passing through the center of the sensing units 30SE. In a case where the pusher 72 is discontinuously provided as described above, each pusher 72 is provided positioning at the center of each sensing unit 30SE.

Figure 15A:
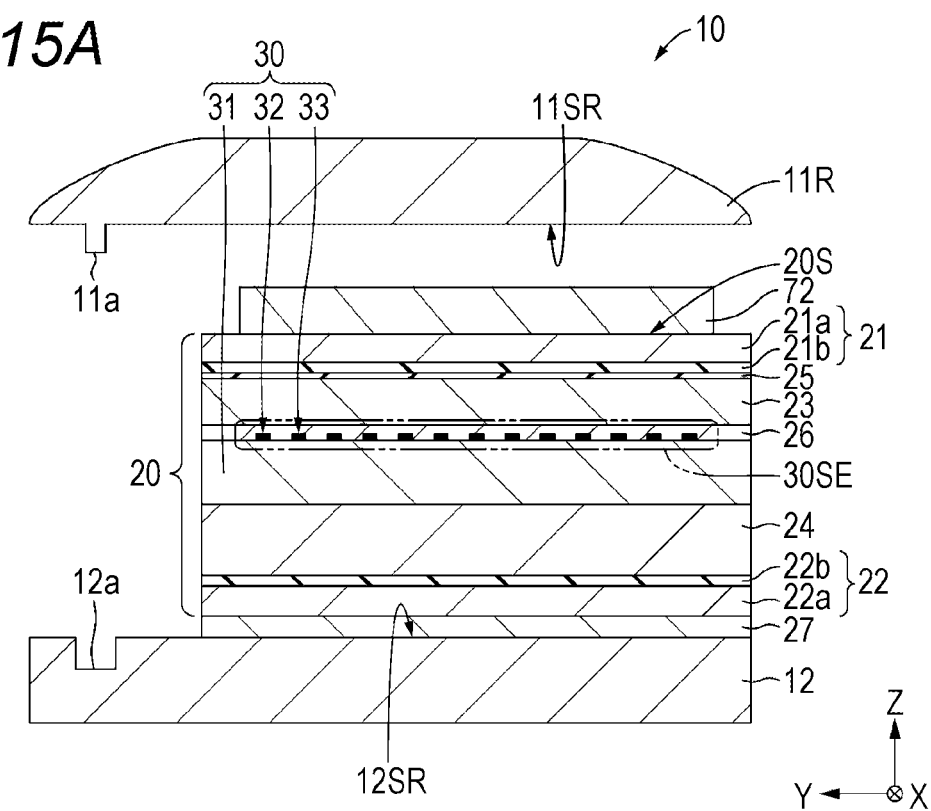
FIGS. 15A and 15B are cross-sectional views each illustrating a modified example of the configuration of the side face portion of the electronic apparatus.

As illustrated in FIG. 14B, it is preferable that the electronic apparatus 10 further includes the cushioning material 71 between the pusher 72 and the inner face 11SR. However, as illustrated in FIG. 15A, the cushioning material 71 may not be provided between the pusher 72 and the inner face 11SR. In this case, the pusher 72 may be a cushioning material. In a case where the cushioning material 71 is further provided between the pusher 72 and the inner face 11SR, the cushioning material 71 may be attached to the pusher 72 or the inner face 11SR.

In a case where the pusher 72 is further provided as described above, the center of the sensing unit 30SE with the best sensitivity can be intensively pressed by the inner face 11SR via the pusher 72, whereby the sensitivity of the sensor 20 can be improved.

Figure 15B:
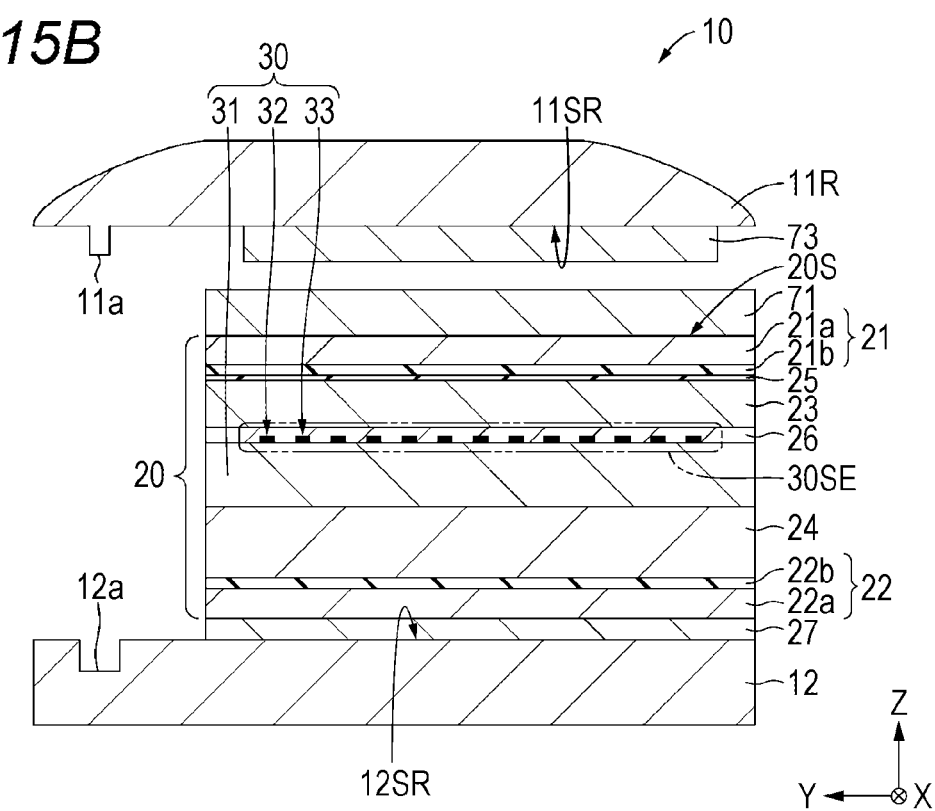

As illustrated in FIG. 15B, the electronic apparatus 10 may further include a pusher 73 as a protrusion on the inner face 11SR. The pusher 73 may be continuously provided or may be discontinuously provided, to the X-axis direction on the inner face 11SR.

In a case where the pusher 73 is continuously provided as described above, the pusher 73 is provided passing through a position opposed to the center of the sensing units 30SE in the inner face 11SR. In a case where the pusher 73 is discontinuously provided as described above, each pusher 73 is provided at a position opposed to the center of each sensing unit 30SE in the inner face 11SR.

As illustrated in FIG. 15B, it is preferable that the electronic apparatus 10 further includes the cushioning material 71 between the pusher 73 and the sensing face 20S. However, the cushioning material 71 may not be provided between the pusher 73 and the sensing face 20S. In a case where the cushioning material 71 is further provided between the pusher 73 and the sensing face 20S, the cushioning material 71 may be attached to the pusher 73 or the sensing face 20S.

In a case where the pusher 73 is further provided as described above, the center of the sensing unit 30SE with the best sensitivity can be intensively pressed by the pusher 73, whereby the sensitivity of the sensor 20 can be improved.

Figure 16A:
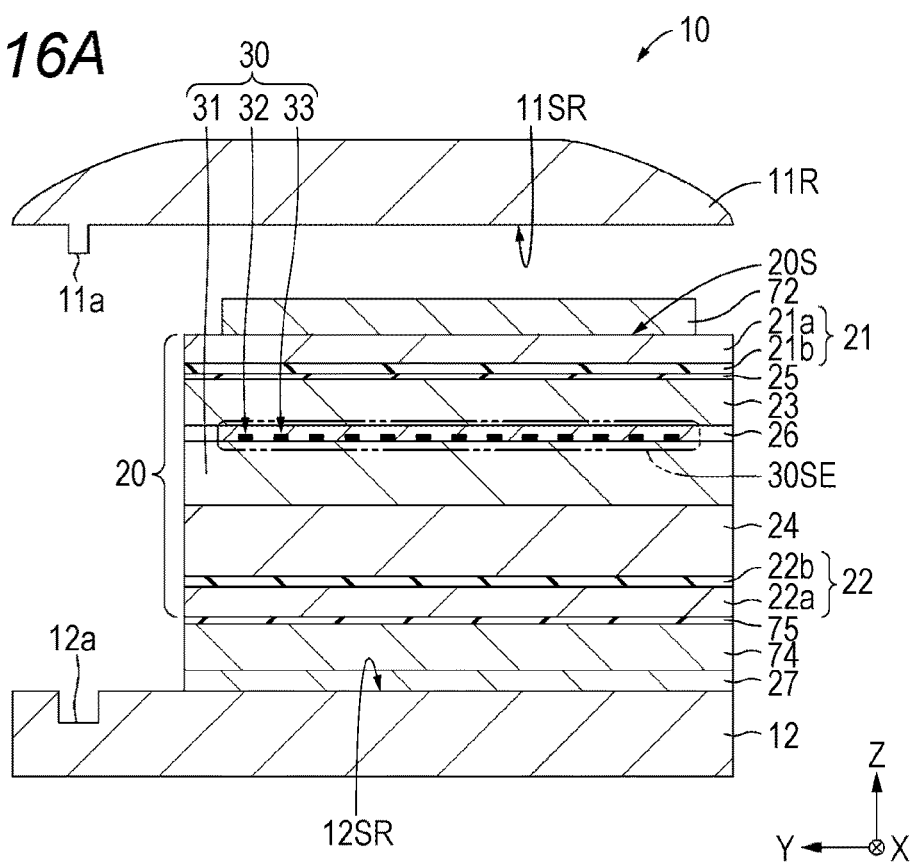
FIGS. 16A and 16B are cross-sectional views each illustrating a modified example of the configuration of the side face portion of the electronic apparatus.

As illustrated in FIG. 16A, the electronic apparatus 10 may further include a sheet-shaped cushioning material 74 between the electrode base 22 and the frame 12. The cushioning material 74 is similar to the cushioning material 71. The cushioning material 74 is attached to the electrode base 22 with an adhesive layer 75, and the cushioning material 74 is attached to the frame 12 with the adhesive layer 27.

Figure 16B:
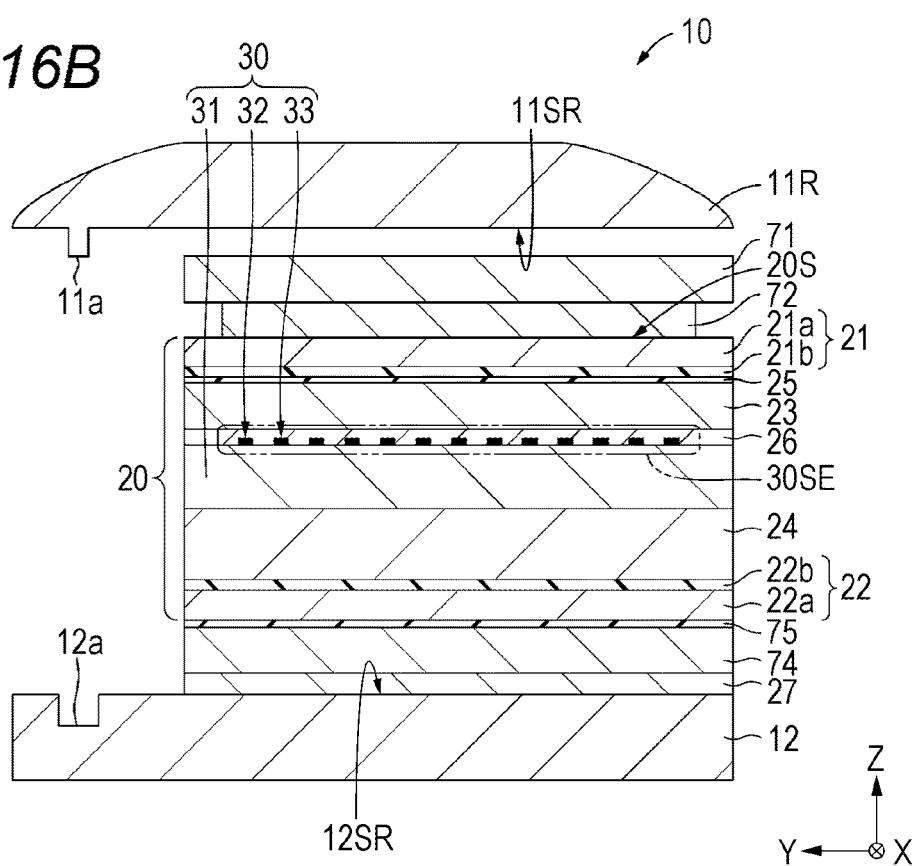

Note that the shape of the cushioning material 74 is not limited to the sheet shape, and may be a columnar body or the like. Furthermore, instead of including the cushioning material 74 between the electrode base 22 and the frame 12, the electronic apparatus 10 may include the cushioning material 74 between the electrode base 22 and the sensor electrode unit 30, or the cushioning material 74 may be provided between the electrode base 22 and the frame 12 and between the electrode base 22 and the sensor electrode unit 30. Furthermore, as illustrated in FIG. 16B, both of the cushioning materials 71 and 74 may be provided, or only the cushioning material 74 may be provided.

Even in a case where the cushioning material 74 is further provided as described above, an effect similar to the case where the cushioning material 71 is provided can be obtained.

Figure 17A:
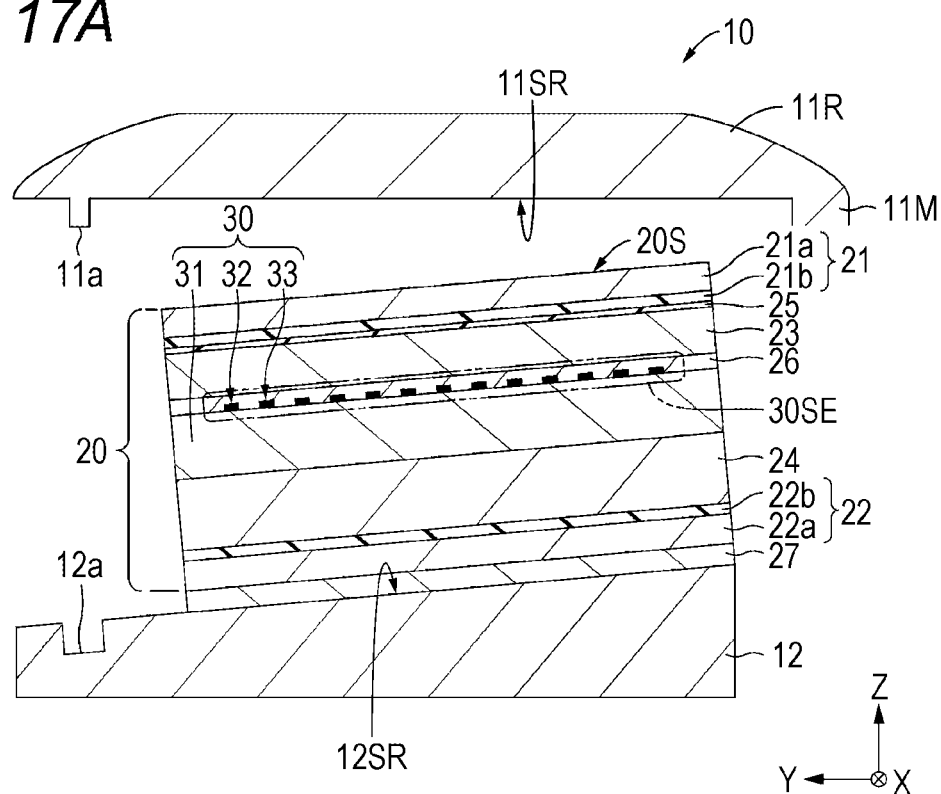
FIGS. 17A and 17B are cross-sectional views each illustrating a modified example of the configuration of the side face portion of the electronic apparatus.

As illustrated in FIG. 17A, the sensing face 20S may be inclined such that the distance between the sensing face 20S and the inner face 11SR increases as the position of the distance is directed away from the main face 11M. In this case, the thickness of the sensor 20 may be constant, and as illustrated in FIG. 17A, the support face 12SR may be inclined such that the distance between the support face 12SR and the inner face 11SR increases as the position of the distance is directed away from the main face 11M. However, the thickness of the sensor 20 may be increased from one end to the other end in the width direction of the sensor 20.

In a case where this configuration is adopted, the following operational effects can be obtained. In other words, in a case where the sidewall 11R is pressed against the sensing face 20S, the inner face 11SR and the sensing face 20S can be brought into contact with each other in a state of being more parallel to each other. Therefore, the sensitivity of the sensor 20 can be improved.

Figure 17B:
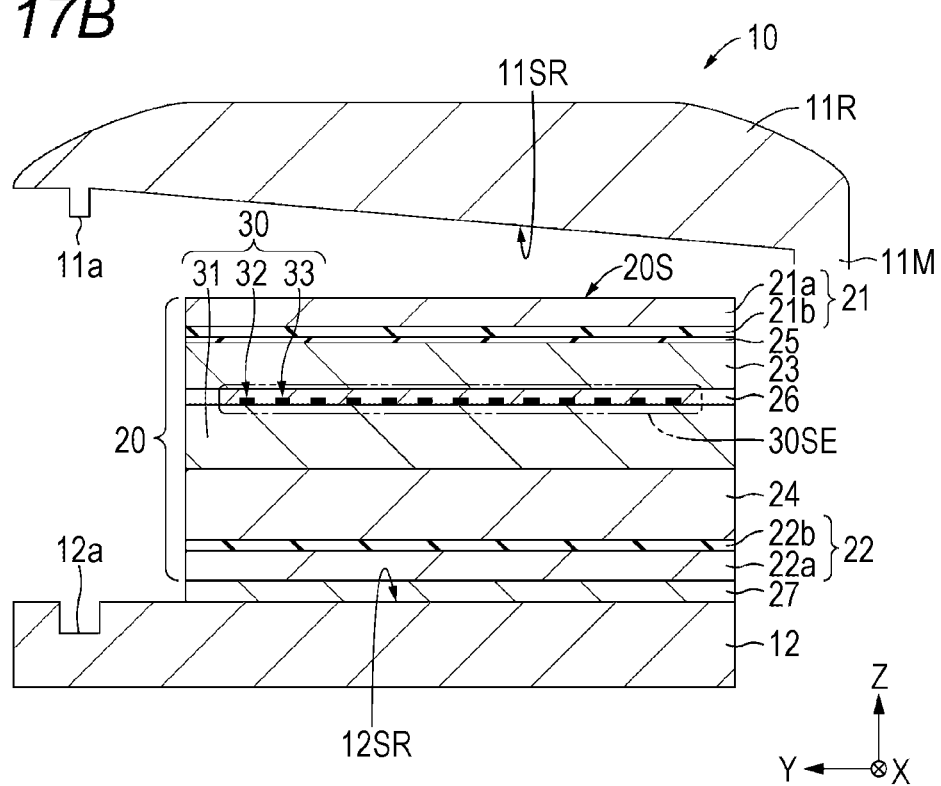

As illustrated in FIG. 17B, the inner face 11SR may be inclined such that the distance between the sensing face 20S and the inner face 11SR increases as the position of the distance is directed away from the main face 11M. Even in a case where this configuration is adopted, an operational effect similar to the above-described case where the sensing face 20S is inclined can be obtained.

Figure 18:
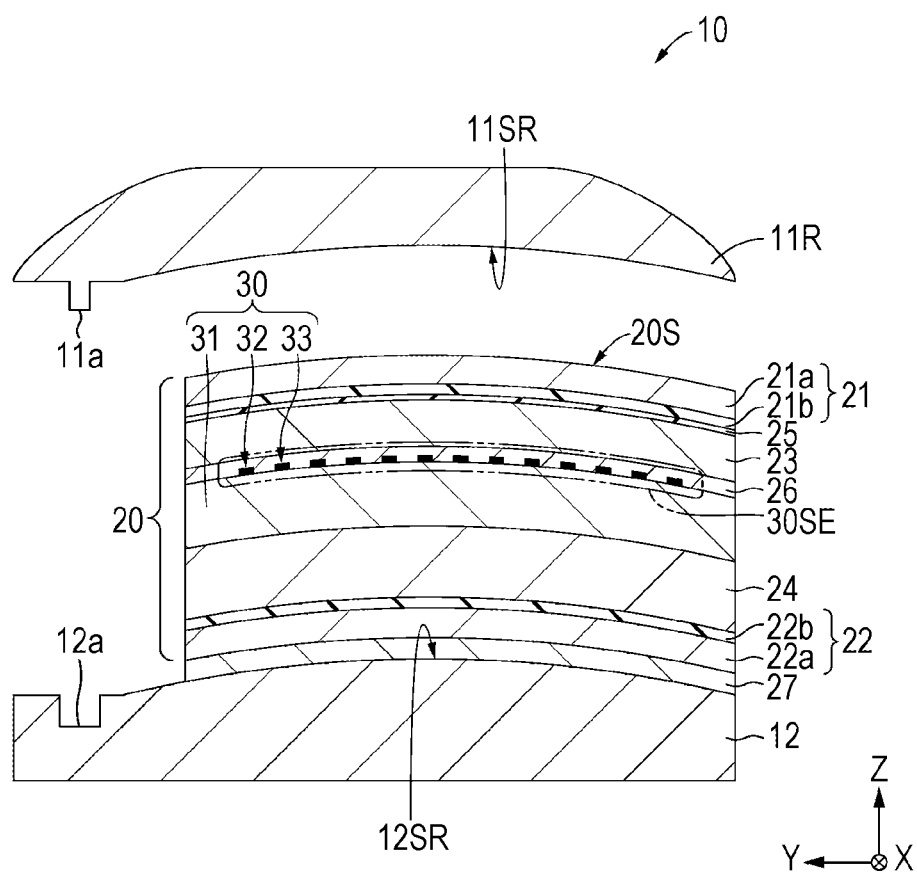
FIG. 18 is a cross-sectional view illustrating a modified example of the configuration of the side face portion of the electronic apparatus.

As illustrated in FIG. 18, in a case where the inner face 11SR has a concave curved face, the sensing face 20S preferably has a convex curved face. In this case, the thickness of the sensor 20 may be constant, and the support face 12SR may have a convex curved face. However, the thickness of the sensor 20 may be varied, and the sensing face 20S may have a convex curved face.

Figure 31:
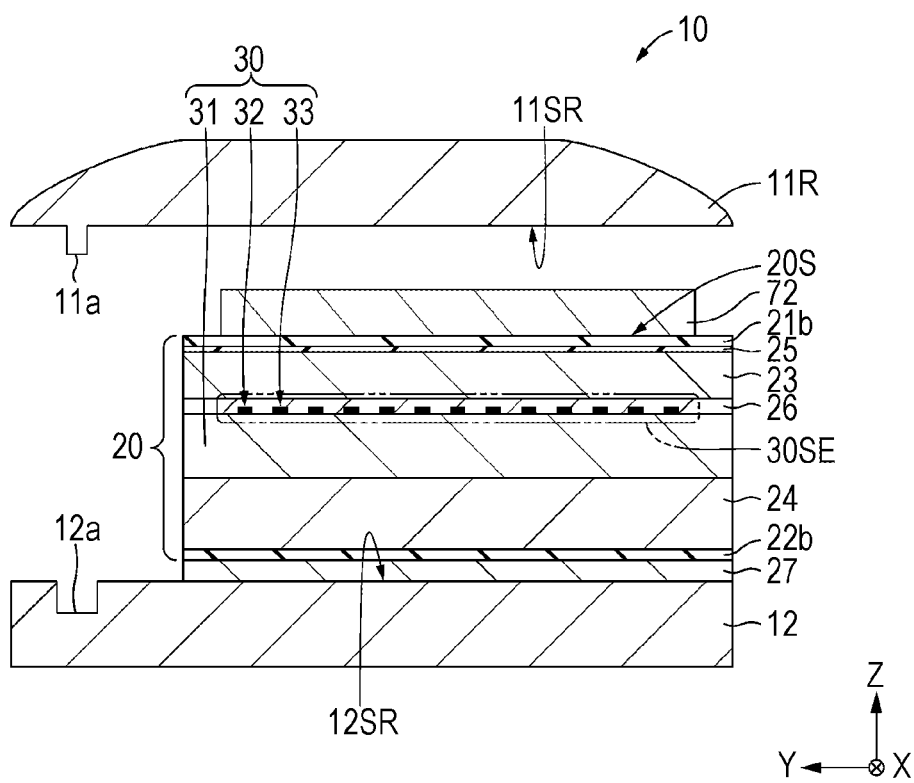
FIG. 31 is a cross-sectional view illustrating a modified example of the configuration of the side face portion of the electronic apparatus.

As illustrated in FIG. 31, the sensor 20 may include only the REF electrode layer 21b instead of the electrode base 21, or may include only the REF electrode layer 22b instead of the electrode base 22. In a case where such a configuration is adopted and an SUS plate is used as the REF electrode layer 21b, from the viewpoint of improving the responsiveness of the sensor 20 at gradual loading, the thickness of the SUS plate is preferably 15 μm or more, more preferably 30 μm or more. From the viewpoint of suppressing an increase in the thickness of the sensor 20, the thickness of the SUS plate is preferably 200 μm or less, more preferably 150 μm or less.

Note that, in the above-described description, the modified examples of the configuration on the sidewall 11R side have been described. However, the configuration on the sidewall 11L side may be similar to the configuration on the sidewall 11R side.

Modified Example of FPC

Figure 19A:
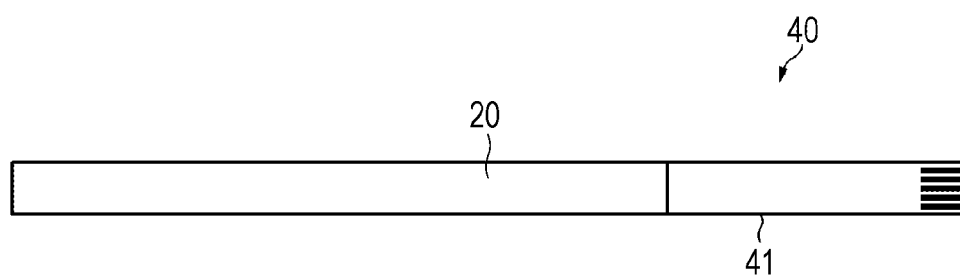
FIG. 19A is a schematic view illustrating a modified example of the flexible printed circuit.
Figure 19B:
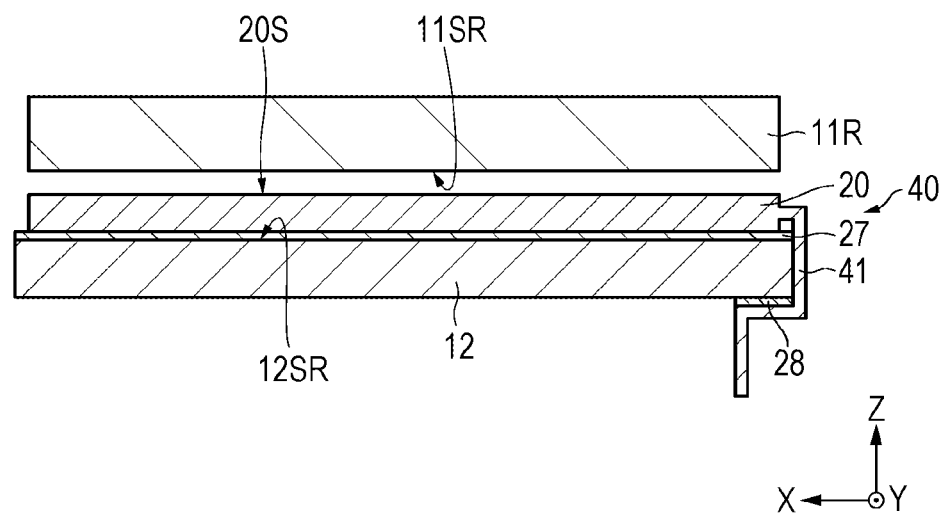
FIG. 19B is a schematic view illustrating the arrangement form of the flexible printed circuit illustrated in FIG. 19A.

As illustrated in FIG. 19A, the FPC 40 may have an elongated rectangular shape. In this case, as illustrated in FIG. 19B, the connecting portion 41 provided at one end of the FPC 40 may be bent at one end of the support face 12SR of the frame 12, and may be attached on the back side face of the support face 12SR via the adhesive layer 28. A noise is generated when a force is applied to the FPC 40, so that the connecting portion 41 is preferably fixed to the frame 12 as described above.

Figure 20A:
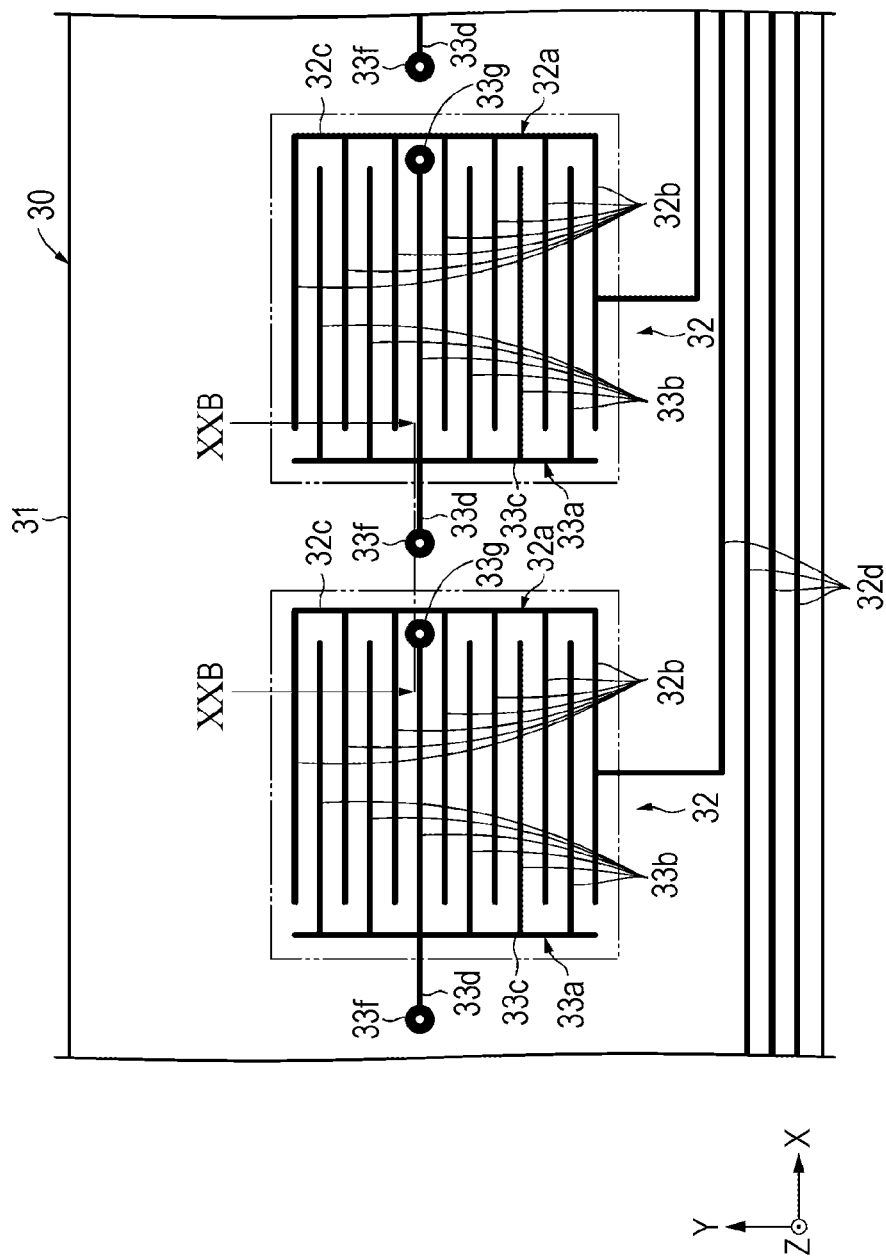
FIG. 20A is a plan view illustrating a modified example of the flexible printed circuit.
Figure 20B:
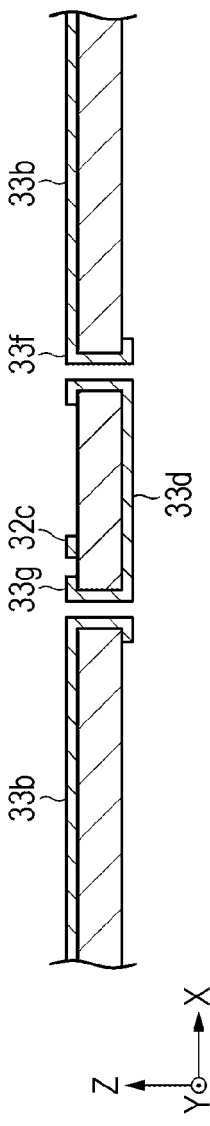
FIG. 20B is a cross-sectional view taken along line XXB-XXB of FIG. 20A.

As illustrated in FIG. 20, the base 31 may have via holes 33f and 33g as through holes. In this case, the via holes 33f and 33g are provided interposing the coupling portion 32c therebetween. The connection portion 33d is routed from the one main face to the other main face of the base 31 via the via hole 33f and returned from the other main face to the one main face of the base 31 via the via hole 33g, and the unit electrode bodies 33a adjacent to each other are connected together. With this arrangement, the adjacent unit electrode bodies 33a can be connected together without a jumper wiring or the like. Therefore, inhibition can be achieved in that the insulating layer (not illustrates) such as the coverlay film that becomes thicker prevents the electrode base 21 from being deformed. Furthermore, the unit electrode bodies 33a can be stably connected together as compared with the case where a jumper wiring or the like is used.

Modified Example of Operation of Electronic Apparatus

The electronic apparatus 10 may perform the following operation during the wake-up operation. The IC 13a determines whether or not the sum of the output values of all the sensing units 30SE for a specified number of frames in succession is a threshold or more, and in a case where it is determined that the sum of the output values of all the sensing units 30SE for the specified number of frames in succession is the threshold or more, the IC 13a may output the wake-up interrupt signal to the CPU 13b. In the case where the electronic apparatus 10 operates as described above, erroneous detection can be suppressed in a case where an object is hit on the side faces 10SR and 10SL of the electronic apparatus 10 and an impact is instantaneously applied.

Figure 21:
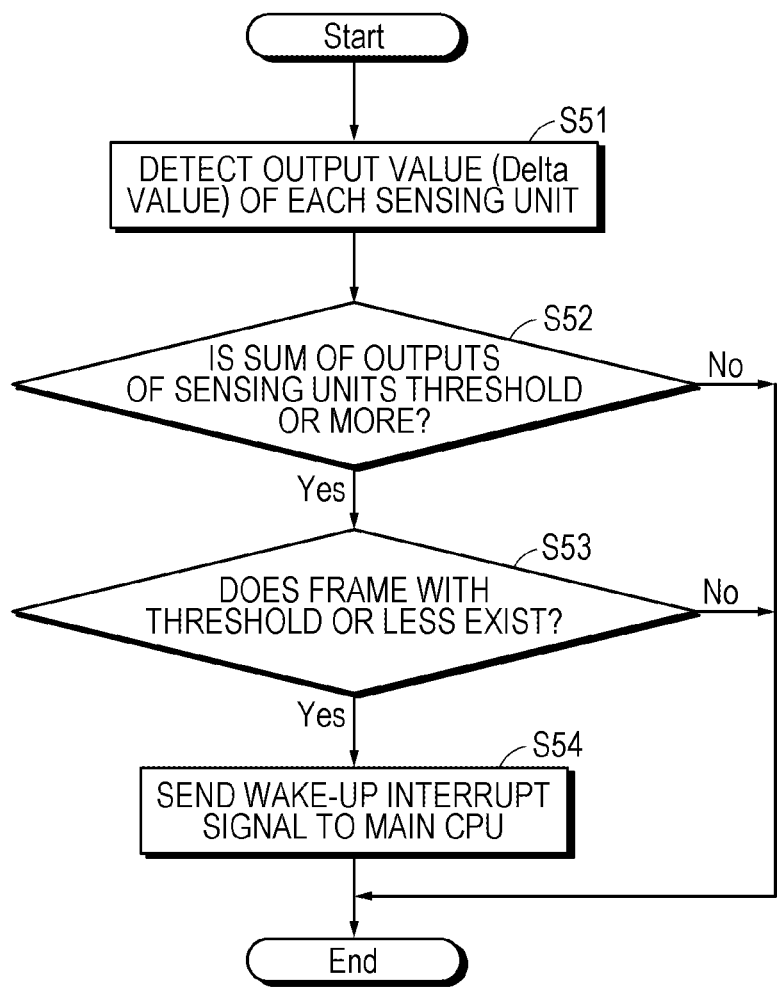
FIG. 21 is a flowchart for describing a modified example of the operation of the electronic apparatus during the wake-up operation.

Furthermore, during the wake-up operation, the electronic apparatus 10 may perform the following operation illustrated in FIG. 21. First, in step S51, the IC 13a detects an output value (delta value) of each sensing unit 30SE. Next, in step S52, the IC 13a determines whether or not the sum of the output values of all the sensing units 30SE for the specified number of frames in succession is a threshold or more.

In a case where it is determined in step S52 that the sum of the output values of all the sensing units 30SE for the specified number of frames in succession is the threshold or more, in step S53, the IC 13a determines whether or not at least one frame for which the sum of the output values of all the sensing units 30SE is a threshold value or less exists in a specified number of frames following the specified number of frames. On the other hand, in a case where it is determined in step S52 that the sum of the output values of all the sensing units 30SE for the specified number of frames in succession is not the threshold or more, the processing is terminated.

In a case where it is determined in step S53 that at least one frame for which the sum of the output values of all the sensing units 30SE is the threshold or less exists in the specified number of frames, in step S54, the IC 13a outputs the wake-up interrupt signal to the CPU 13b. On the other hand, in a case where it is determined in step S53 that at least one frame for which the sum of the output values of all the sensing units 30SE is the threshold or less does not exist in the specified number of frames, the process is terminated.

In a case where the electronic apparatus 10 operates as described above, malfunction of the wake-up function can be suppressed in a case where the electronic apparatus 10 housed in a bag, a clothes pocket, or the like is pressed for a long time on a crowded train or the like.

Furthermore, the electronic apparatus 10 may perform the following operation during the wake-up operation. In a case where the IC 13a determines whether or not the output value of the sensing unit 30SE at a specified position among all the sensing units 30SE is a threshold or more and the IC 13a determines that the output value of the sensing unit 30SE at the specified position is the threshold or more, the IC 13a may output a wake-up interrupt signal to the CPU 13b.

Figure 22A:
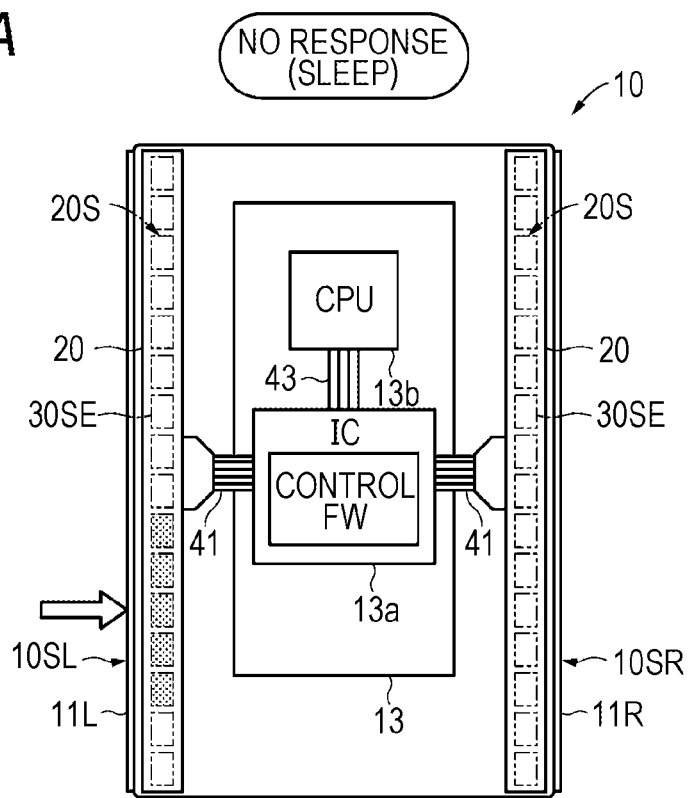
FIGS. 22A and 22B are schematic views for describing the operation of the electronic apparatus during the wake-up operation.
Figure 22B:
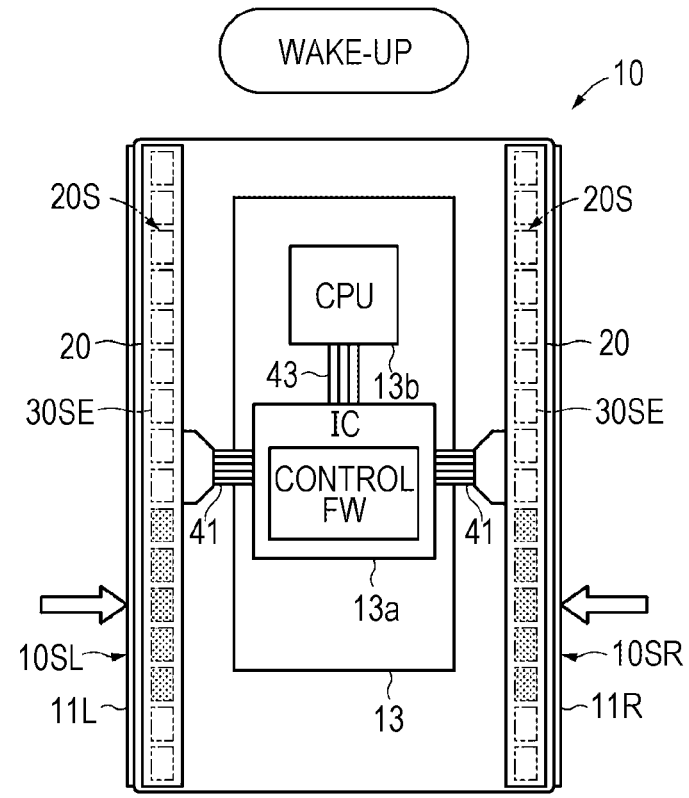

For example, as illustrated in FIG. 22A, even though the sensing unit 30SE of the sensor 20 on the side face 10SL is pressed, the CPU 13b does not start and the sleeping mode is maintained. On the other hand, as illustrated in FIG. 22B, when the sensing units 30SE at the specified positions among the sensing units 30SE of the sensors 20, 20 on both side faces 10SR and 10SL are pressed, the CPU 13b wakes up from the sleeping mode and returns to the normal start state.

In a case where the electronic apparatus 10 operates as described above, the CPU 13b wakes up from the sleeping mode and returns to the normal start state only in a case where the user consciously performs a specific gripping. Therefore, malfunction of the wake-up function can be suppressed. Furthermore, the security of the electronic apparatus 10 can be improved.

Example of Electronic Apparatuses Other than Smart Phone

In the above-described first embodiment, the case where the electronic apparatus is a smartphone has been described as an example. However, the present technology is not limited thereto, and the present technology is applicable to various electronic apparatuses having an exterior body such as a casing. The present technology is applicable to, for example, a personal computer, a mobile phone other than a smart phone, a television, a remote controller, a camera, a game device, a navigation system, an electronic book, an electronic dictionary, a portable music player, a wearable terminal such as a smart watch and a head-mound display, a radio, a stereo, a medical device, and a robot.

Examples Other than Electronic Apparatuses

The present technology is not limited to the electronic apparatuses, and is applicable to various apparatuses other than the electronic apparatuses. The present technology is applicable to, for example, electric equipment such as an electric tool, a refrigerator, an air conditioner, a water heater, a microwave oven, a dishwasher, a washing machine, a dryer, lighting equipment, and a toy. Moreover, the present technology is applicable to a building such as a house, a building member, a conveyance, furniture such as a table and a desk, a manufacturing apparatus, an analytical instrument, and the like. Examples of the building member include a paving stone, a wall material, a floor tile, a floor board, and the like. Examples of the conveyance include, for example a vehicle (such as an automobile and a motorcycle), a ship, a submarine, a railroad vehicle, an aircraft, a spacecraft, an elevator, play equipment, and the like.

Other Modified Examples

In the first embodiment, the example in which the present technology is applied to the side faces 10SR and 10SL of the electronic apparatus 10 has been described. However, the present technology may be applied to the back face or the front face of the electronic apparatus.

In the first embodiment, the example in which the respective spaces are provided between the inner face 11SR and the sensing face 20S and between the inner face 11SL and the sensing face 20S has been described. However, the respective sensors 20 may be provided such that the inner face 11SR and the sensing face 20S are in contact or substantially contact with each other, and the inner face 11SL and the sensing face 20S are in contact or are substantially in contact with each other.

In the first embodiment, the example in which electronic apparatus 10 includes the deformable layer 23 between the electrode base 21 and the sensor electrode unit 30, and includes the deformable layer 24 between the electrode base 22 and the sensor electrode unit 30 has been described. However only one of the deformable layers 23 and 24 may be provided.

In the first embodiment, the example in which the plurality of sensing units 30SE is disposed forming one array in the X-axis direction has been described. However the plurality of sensing units 30SE may be disposed forming two or more arrays.

The electronic apparatus 10 may include, on the side faces 10SR and 10SL, a zoom-in/zoom-out operation region as a slide operation region where a zoom-in/zoom-out operation of a camera can be performed with a slide operation. In this case, the IC 13a may control the zoom-in and zoom-out of the camera in accordance with the slide operation on the zoom-in/zoom-out operation region.

The electronic apparatus 10 may include, on the side faces 10SR and 10SL, a screen operation region as a slide operation region for performing a screen display operation such as screen scroll or pointer movement with a slide operation. In this case, the IC 13a may control the screen display such as the screen scroll or the pointer movement in accordance with the slide operation on the screen operation region.

Note that the sound volume adjustment region VR, the zoom-in/zoom-out operation region, and the screen operation region may be the same regions or may be the regions different from each other.

2 Second Embodiment

Figure 23:
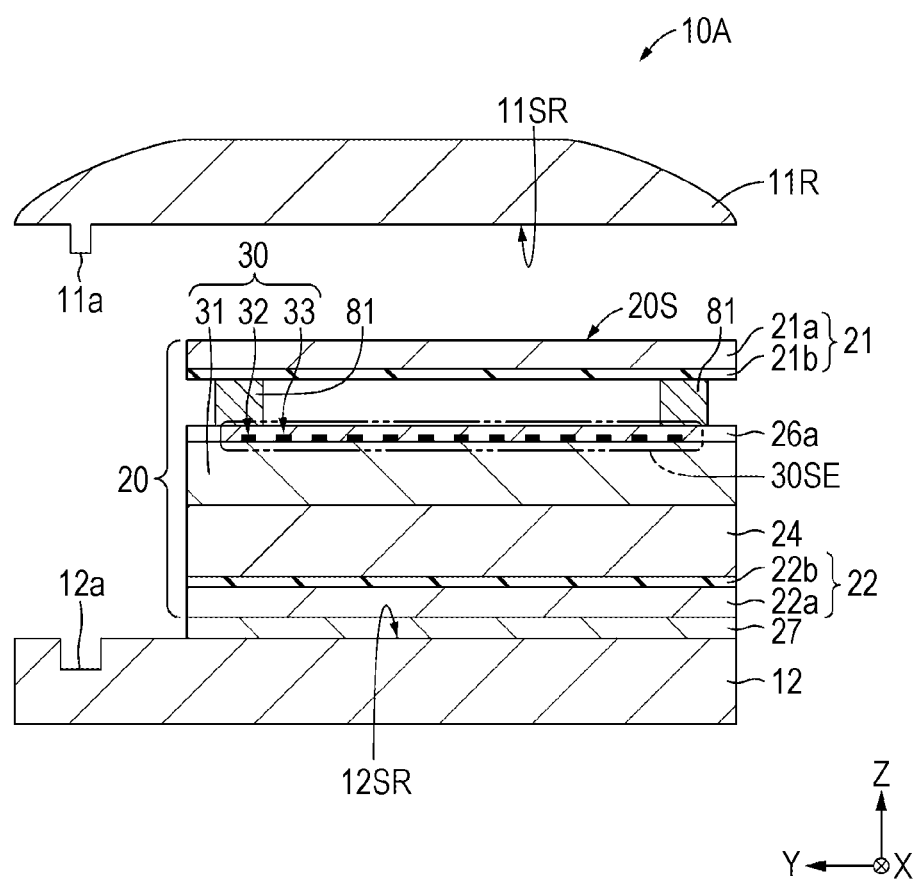
FIG. 23 is a cross-sectional view illustrating the configuration of an electronic apparatus according to a second embodiment of the present technology.

As illustrate in FIG. 23, an electronic apparatus 10A according to a second embodiment of the present technology differs from the electronic apparatus 10 according to the first embodiment in that a plurality of columnar bodies 81 elastically deformed by pressing of the sensing face 20S is provided instead of the deformable layer 23, and an insulating layer 26a is provided instead of the adhesive layer 26. Note that, in the second embodiment, parts similar to those of the first embodiment are denoted by the same reference numerals, and description thereof is omitted.

The columnar body 81 includes a pressure-sensitive adhesive. With the columnar body 81 in plan view in the Z-axis direction, the columnar body 81 has a circular shape, an elliptic shape, an oval shape, a polygonal shape such as a quadrangular shape, an indefinite shape, or the like, for example. The columnar body 81 is formed with a printing method such as a screen printing method or the like. In a case where the columnar body 81 is formed with the screen printing method, each columnar body 81 is preferably substantially the same in area, when the columnar body 81 is viewed in plan view in the Z-axis direction. When the columnar bodies 81 are substantially the same in area, the columnar bodies 81 are also substantially the same in height, so that variations in sensitivity can be suppressed.

Figure 24A:
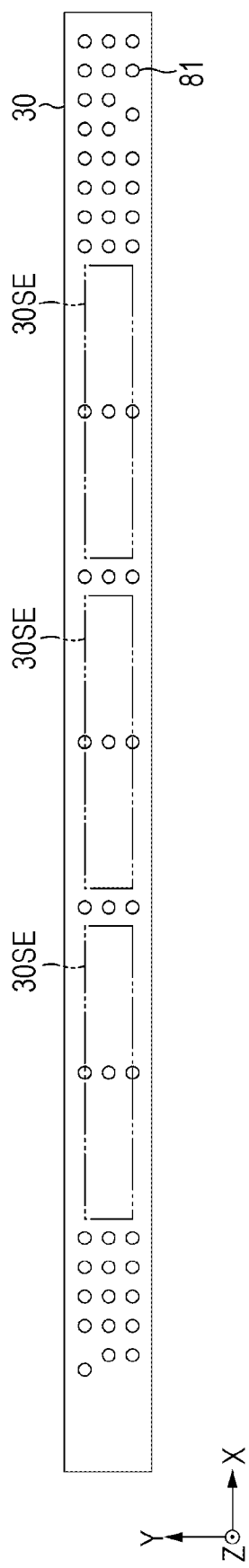
FIGS. 24A, 24B, and 24C are plan views each illustrating the arrangement form of a columnar body.
Figure 24B:
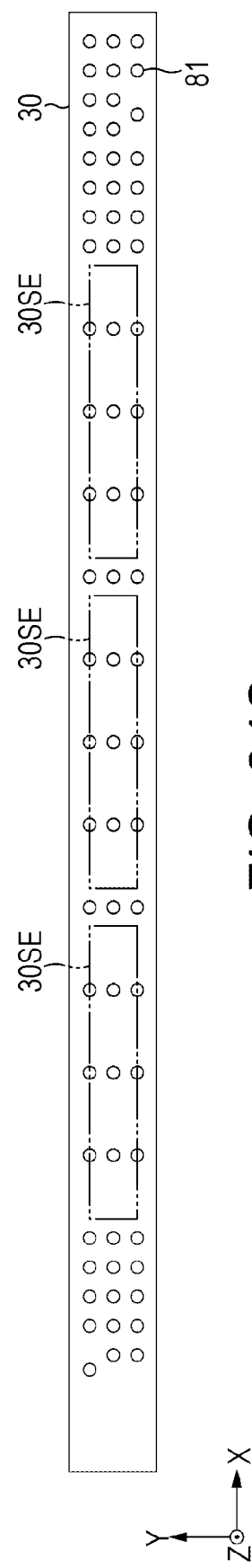
Figure 24C:
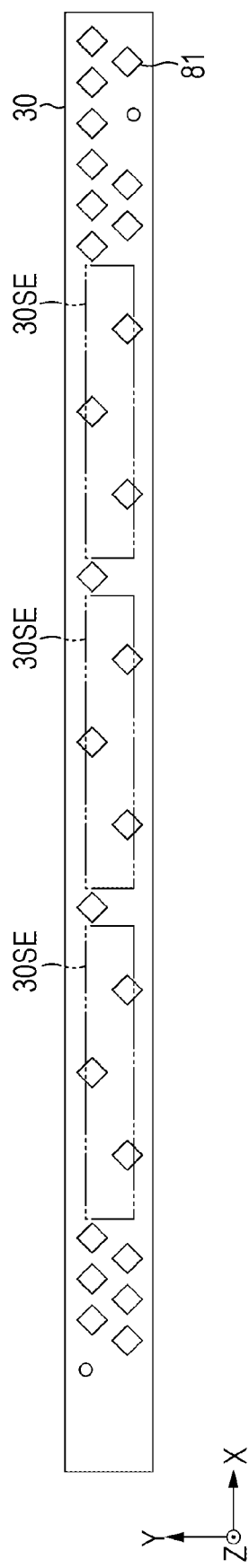

As illustrated in FIGS. 24A and 24B, the columnar bodies 81 are preferably sparsely provided on the sensing units 30SE. Specifically, the density of the columnar bodies 81 on the sensing units 30SE is preferably lower than the density of the columnar bodies 81 in the region outside the sensing units 30SE. In a case where such a configuration is adopted, the electrode base 21 on the sensing units 30SE is easily deformed, so that the sensitivity of the sensor 20 is improved. As illustrate in FIG. 24C, reliability can be improved for the columnar body 81 having a larger area when the columnar body 81 is viewed in plan view in the Z-axis direction.

Modified Examples

Figure 25:
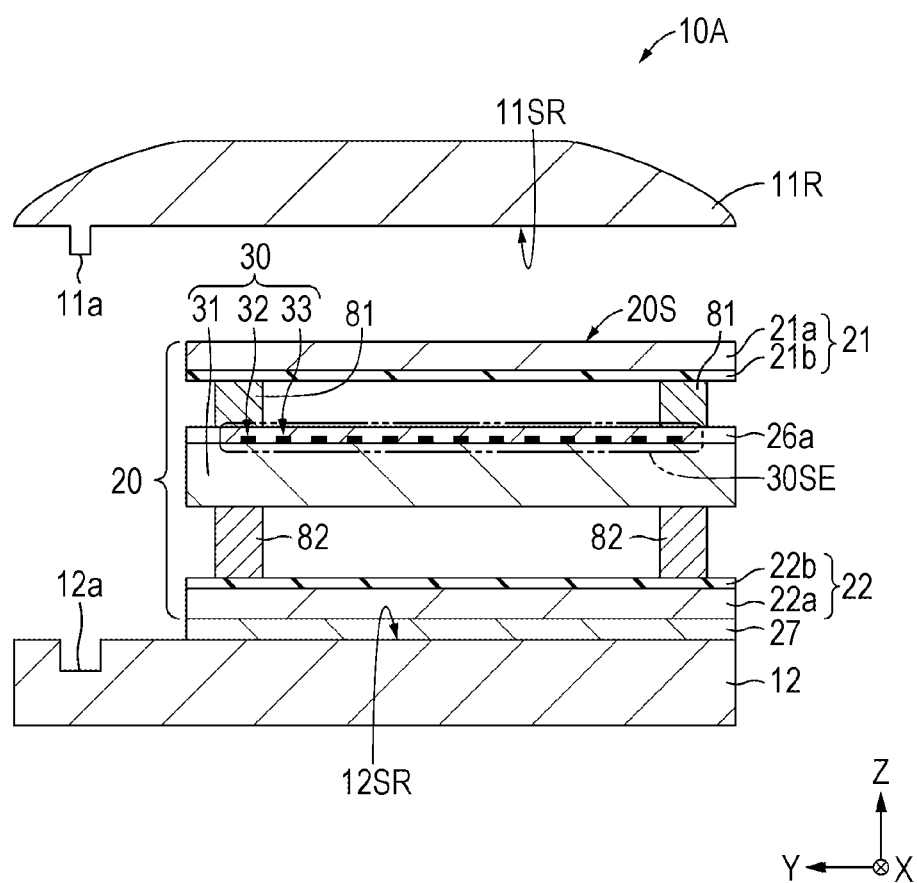
FIG. 25 is a cross-sectional view illustrating the configuration of the electronic apparatus according to a modified example of the second embodiment of the present technology.

As illustrated in FIG. 25, the electronic apparatus 10A may include a plurality of columnar bodies 82 instead of the deformable layer 24. The columnar bodies 81 provided on the one main face side of the sensor electrode unit 30 (see FIG. 26A) and the columnar bodies 82 provided on the other main face side of the sensor electrode unit 30 (see FIG. 26B) are preferably complementarily provided so as not to overlap with each other in the thickness direction (Z-axis direction) of the sensor electrode unit 30. This is because the sensitivity of the sensor 20 can be improved.

3 Third Embodiment

Figure 27:
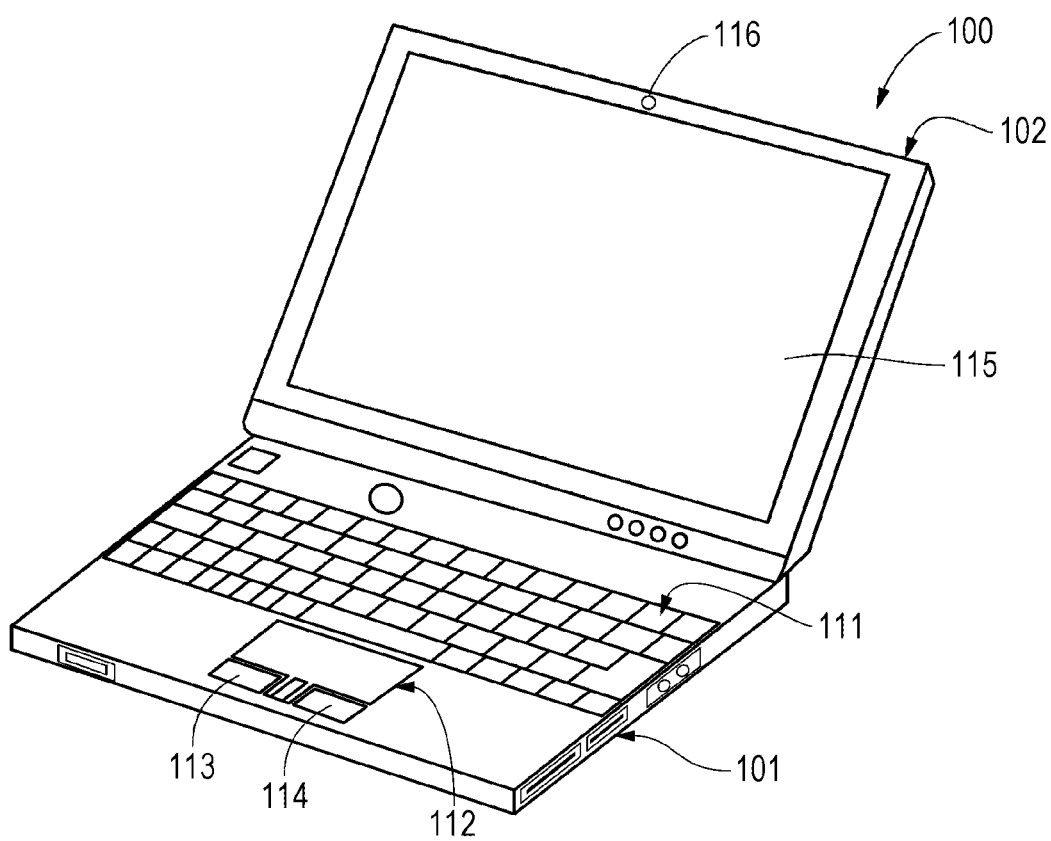
FIG. 27 is a cross-sectional view illustrating the configuration of an electronic apparatus according to a third embodiment of the present technology.

As illustrated in FIG. 27, an electronic apparatus 100 according to a third embodiment of the present technology is a so-called laptop personal computer, and includes a computer main body 101 and a display 102. The computer main body 101 includes a keyboard 111, a wheel/pad operator 112, and click buttons 113 and 114. The display 102 includes a display element 115 and a camera module 116.

Figure 28A:
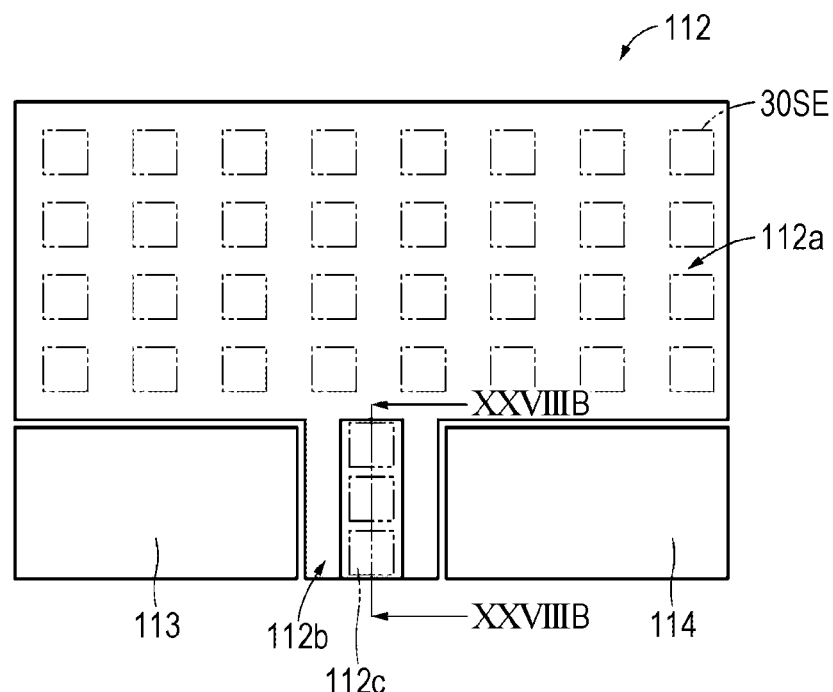
FIG. 28A is a plan view illustrating the configuration of a wheel/pad operator.

As illustrated in FIG. 28A, the wheel/pad operator 112 includes a touch pad operator 112a and a pseudo-wheel operator 112b. The touch pad operator 112a has a substantially rectangular shape and the pseudo-wheel operator 112b is provided protruding from the center of the long side of the touch pad operator 112a. The pseudo-wheel operator 112b is provided between the click buttons 113 and 114.

Figure 28B:
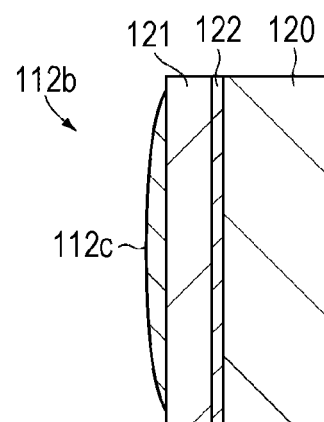
FIG. 28B is a cross-sectional view taken along line XXVIIIB-XXVIIIB of FIG. 28A.

The pseudo-wheel operator 112b is provided with a pseudo-wheel button 112c. As illustrated in FIG. 28B, the pseudo-wheel button 112c is a convex portion protruding with respect to the surface of the wheel/pad operator 112, and the protruding face is a partial cylindrical face imitating a general wheel button. The peripheral face of the pseudo-wheel button 112c is slid in the peripheral direction, whereby an input operation similar to that with a general hole button can be performed.

Figure 29A:
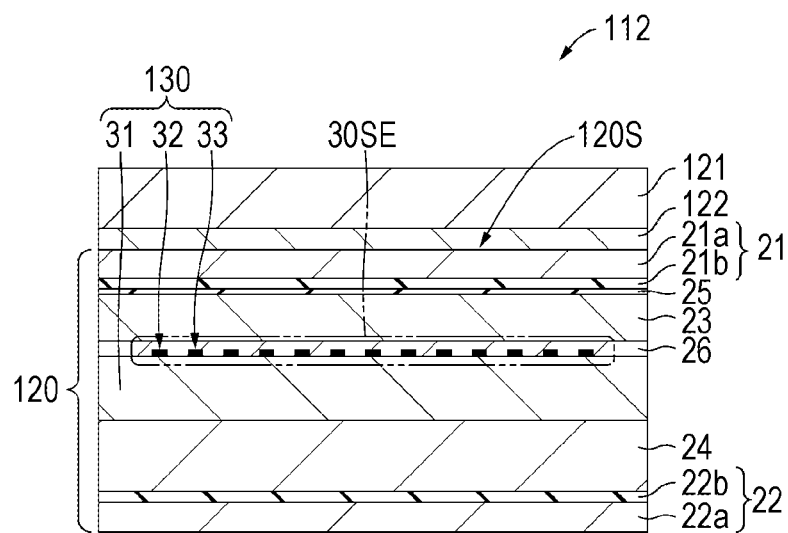
FIG. 29A is a cross-sectional view illustrating the configuration of the wheel/pad operator.

As illustrated in FIGS. 28B and 29A, the wheel/pad operator 112 includes a sensor 120 and an exterior body 121 provided on a sensing face 120S of the sensor 120. As illustrated in FIG. 28B, the wheel/pad operator 112 further includes the pseudo-wheel button 112c on the surface of the exterior body 121 of the pseudo-wheel operator 112b. The back face side of the sensor 120 is supported by a support (not illustrated).

As illustrated in FIG. 29A, the sensor 120 differs from the sensor 20 in the first embodiment in that a sensor electrode unit 130 in which the sensing unit 30SE is two-dimensionally disposed is provided. In part of the sensor 120 corresponding to the touch pad operator 112a, as illustrated in FIG. 28A, a plurality of sensing units 30SE is disposed in a matrix. On the other hand, in part of the sensor 120 corresponding to the pseudo-wheel operator 112b, as illustrated in FIG. 28A, a plurality of sensing units 30SE is disposed forming an array extending in the longitudinal direction (pseudo rotational direction) of the pseudo-wheel button 112c. The array formed by the plurality of sensing units 30SE may be one array or two or more arrays.

The exterior body 121 is, for example, a resin sheet, an elastomer, an artificial leather, or the like. The exterior body 121 is attached to the sensor 120 with an adhesive layer 122. Note that the exterior body 121 is usually easier to deform than the exterior body 11 in the first embodiment, so that the deformable layer 24 preferably contains a foamed resin. This is because the sensitivity of the sensor 20 can be improved.

[Effects]

For the electronic apparatus 100 according to the third embodiment, the sensing units 30SE are provided below the pseudo-wheel button 112c. Thus, an input operation similar to that with a general hole button can be performed with a pseudo-wheel operation, without including a rotation body.

Modified Examples

Figure 29B:
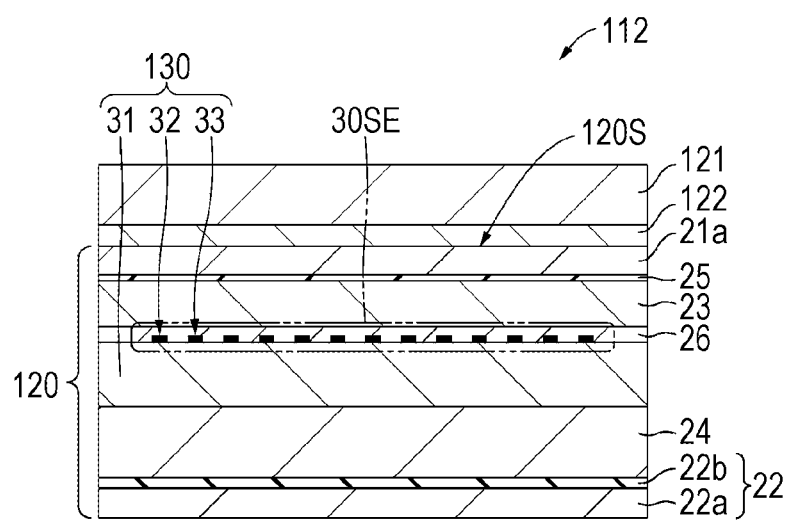
FIG. 29B is a cross-sectional view illustrating a modified example of the configuration of the wheel/pad operator.

As illustrated in FIG. 29B, the sensor 120 may not include the REF electrode layer 21b. This case enables the sensor 120 to detect approach or contact of a conductive body (e.g., a finger, a stylus, or the like) on the sensing face 120S. Therefore, a function as an electrostatic-capacity-type touch sensor can be added to the wheel/pad operator 112.

The wheel/pad operator 112 may not include the REF electrode layer 21b in the part of the sensor 120 corresponding to the touch pad operator 112a, and may include the REF electrode layer 21b in the part of the sensor 120 corresponding to the pseudo-wheel operator 112b. In this case, the function as the electrostatic-capacity-type touch sensor can be added only to the touch pad operator 112a of the wheel/pad operator 112.

Figure 30:
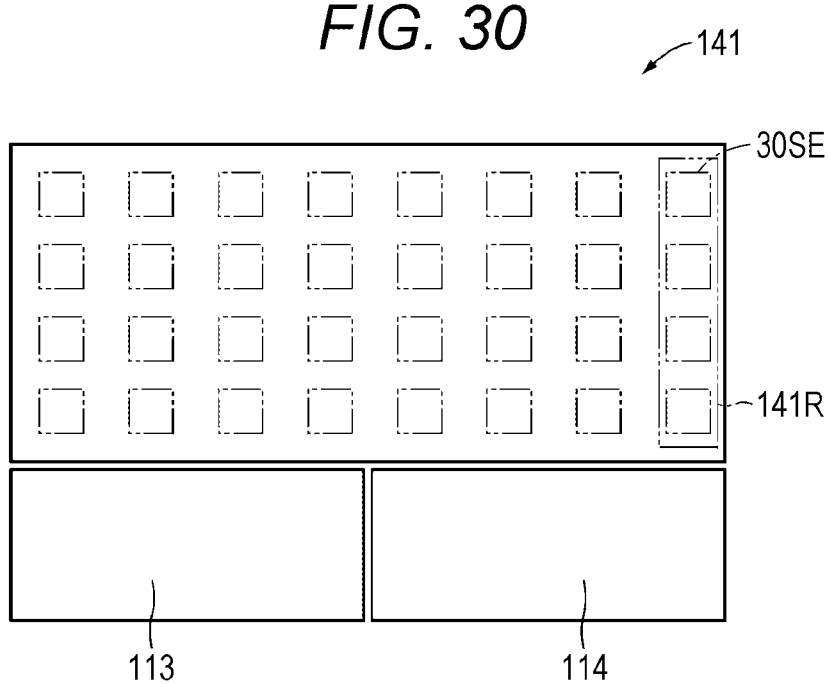
FIG. 30 is a plan view illustrating the configuration of a touch pad operator.

As illustrated in FIG. 30, instead of the wheel/pad operator 112, a touch pad operator 141 may be provided. The touch pad operator 141 is similar to the touch pad operator 112a in the third embodiment. In this case, on the electronic apparatus 100, the user may select a desired region 141R and may allow the region 141R to function as a pseudo-wheel button.

EXAMPLES

Hereinafter, the present technology will be specifically described with examples; however, the present technology is not limited to only these examples. Note that, in the following examples, parts corresponding to those of the above-described embodiments will be described with the same reference numerals.

Table 1 indicates the respective configurations of sensors 20 of Examples 1 to 11.

TABLE 1

| | Pusher | Electrode/Electrode base | Adhesive layer | Deformable layer | Adhesive layer | Sensor electrode unit | Deformable layer | Electrode/Electrode base | Adhesive layer |
|---|---|---|---|---|---|---|---|---|---|
| Example 1 | PET (100) Neo Fix (100) | SUS (30) | Included with PureCell (5) | PureCell S020Ad | Neo Fix (10) | FPC | Neo Fix (100) | SUS (100) | Neo Fix (30) |
| Example 2 | PET (100) Neo Fix (100) | SUS (30) | Neo Fix (10) | Poron SR-S-32P | Neo Fix (10) | FPC | Neo Fix (100) | SUS (100) | Neo Fix (30) |
| Example 3 | PET (100) Neo Fix (100) | Al vapor-deposited PET (100) | Neo Fix (10) | Poron SR-S-32P | Neo Fix (10) | FPC | Neo Fix | Al vapor-deposited PET (100) | Neo Fix (30) |
| Example 4 | PET (100) Neo Fix (100) | Al vapor-deposited PET (50) | Neo Fix (10) | Poron SR-S-32P | Neo Fix (100) | FPC | Neo Fix (100) | Al vapor-deposited PET (50) | Neo Fix (30) |
| Example 5 | PET (100) Neo Fix (100) | Al vapor-deposited PET (50) | Neo Fix (10) | PureCell 020 | Neo Fix (10) | FPC | Neo Fix (100) | Al vapor-deposited PET (50) | Neo Fix (30) |
| Example 6 | PET (100) Neo Fix (100) | SUS (30) | Neo Fix (10) | PureCell 006 | Neo Fix (10) | FPC | Neo Fix (100) | SUS (100) | Neo Fix (30) |
| Example 7 | PET (100) Neo Fix (100) | SUS (30) | Included with PureCell (5) | PureCell S006AD | Neo Fix (10) | FPC | Neo Fix (100) | SUS (100) | Neo Fix (30) |
| Example 8 | PET (100) Neo Fix (100) | SUS (30) | Neo Fix (10) | PureCell 010 | Neo Fix (10) | FPC | Neo Fix (100) | SUS (100) | Neo Fix (30) |
| Example 9 | PET (100) Neo Fix (100) | SUS (30) | Neo Fix (10) | PureCell S010 | Neo Fix (10) | FPC | Neo Fix (100) | SUS (100) | Neo Fix (30) |
| Example 10 | PET (100) Neo Fix (100) | SUS (30) | Included with PureCell (5) | PureCell S010AD | Neo Fix (10) | FPC | Neo Fix (100) | SUS (100) | Neo Fix (30) |
| Example 11 | PET (100) Neo Fix (100) | SUS (30) | Neo Fix (10) | PureCell 020 | Neo Fix (10) | FPC | Neo Fix (100) | SUS (100) | Neo Fix (30) |

Note that, in Table 1, the numerical values enclosed in parentheses each indicate the thickness [μm] of a member.

Example 1

A sensor 20 having the configuration illustrated in FIG. 31 was prepared. As each member included in the sensor 20, the following were used.

Pusher 72: PET film (thickness 100 μm)+ double-sided pressure-sensitive adhesive sheet (Nichiei Kakoh Co., Ltd., trade name: Neo Fix 100 (thickness 100 μm))

REF electrode layer 21b: SUS plate (thickness 30 μm)

Deformable layer 23 with adhesive layer 25: polyurethane foam with adhesive layer (manufactured by INOAC CORPORATION, trade name: PureCell S020AD (total thickness 200 μm, adhesive layer thickness 5 μm)

Adhesive layer 26: double-sided pressure-sensitive adhesive sheet (manufactured by: Nichiei Kakoh Co., Ltd., trade name: Neo Fix 10 (thickness 10 μm))

Sensor electrode unit 30: FPC

Deformable layer 24: double-sided pressure-sensitive adhesive sheet (Nichiei Kakoh Co., Ltd., trade name: Neo Fix 100 (thickness 100 μm))

REF electrode layer 22b: SUS plate (thickness 100 μm)

Adhesive layer 27: double-sided pressure-sensitive adhesive sheet (manufactured by Nichiei Kakoh Co., Ltd., trade name: Neo Fix 30 (thickness 30 μm))

Example 2

A sensor 20 having a configuration similar to that of Example 1 was prepared except including the following as the adhesive layer 25 and the deformable layer 23.

Adhesive layer 25: double-sided pressure-sensitive adhesive sheet (manufactured by Nichiei Kakoh Co., Ltd., trade name: Neo Fix 10 (thickness 10 μm))

Deformable layer 23: laminate of PET film (thickness 50 μm)/polyurethane foam (thickness 200 μm) (manufactured by ROGERS INOAC CORPORATION, trade name: PORON SR-S-32P (thickness 250 μm))

Example 3

A sensor 20 having the configuration illustrated in FIG. 15 was prepared. Specifically, the sensor 20 having a configuration similar to that of Example 2 was prepared, except including the following electrode bases 21 and 22, instead of the REF electrode layers 21b and 22b.

Electrode bases 21 and 22: aluminum vapor-deposited PET films (thickness 100 μm)

Example 4

A sensor 20 having a configuration similar to that of Example 3 was prepared except including the following as the electrode bases 21 and 22.

Electrode bases 21 and 22: aluminum vapor-deposited PET films (thickness 50 μm)

Example 5

A sensor 20 having a configuration similar to that of Example 4 was prepared except including the following as the deformable layer 23.

Deformable layer 23: polyurethane foam (manufactured by INOAC CORPORATION, trade name: PureCell 020 (thickness 200 μm))

Example 6

A sensor 20 having a configuration similar to that of Example 2 was prepared except including the following as the deformable layer 23.

Deformable layer 23: polyurethane foam (manufactured by INOAC CORPORATION, trade name: PureCell 006 (thickness 60 μm))

Example 7

A sensor 20 having a configuration similar to that of Example 1 was prepared except including the following as the deformable layer 23 with the adhesive layer 25.

Deformable layer 23 with adhesive layer 25: polyurethane foam with adhesive layer (manufactured by INOAC CORPORATION, trade name: PureCell S006AD (total thickness 60 μm, adhesive layer thickness 5 μm))

Example 8

A sensor 20 having a configuration similar to that of Example 2 was prepared except including the following as the deformable layer 23.

Deformable layer 23: polyurethane foam (manufactured by INOAC CORPORATION, trade name: PureCell 010 (thickness 100 μm))

Example 9

A sensor 20 having a configuration similar to that of Example 2 was prepared except using the following as the deformable layer 23.

Deformable layer 23: polyurethane foam (manufactured by INOAC CORPORATION, trade name: PureCell S010 (thickness 100 μm))

Example 10

A sensor 20 having a configuration similar to that of Example 1 was prepared except including the following as the deformable layer 23 with the adhesive layer 25.

Deformable layer 23 with adhesive layer 25: polyurethane foam with adhesive layer (manufactured by INOAC CORPORATION, trade name: PureCell S010AD (total thickness 100 μm, adhesive layer thickness 5 μm))

Example 11

A sensor 20 having a configuration similar to that of Example 2 was prepared except including the following as the deformable layer 23.

Deformable layer 23: polyurethane foam (manufactured by INOAC CORPORATION, trade name: PureCell 020 (thickness 200 μm))

[Evaluation 1]
(Amount of Deformation at 500 gf Load)

A load of 500 gf was applied to each sensing face 20S of the sensors 20 of Examples 2 to 4 to obtain the amount of deformation of the sensing face 20S.

Table 2 indicates the evaluation results of the sensors 20 of Examples 2 to 4.

TABLE 2

|  | Type of Electrode/Electrode base | Thickness of Electrode/Electrode base [μm] | Amount of deformation at 500 gf load [μm] |
|---|---|---|---|
| Example 2 | SUS | 30 | 134 |
| Example 3 | Al vapor-deposited PET | 100 | 164 |
| Example 4 | Al vapor-deposited PET | 50 | 176 |

Table 2 indicates that use of the material having high rigidity as the REF electrode layer 21b or the electrode base 21 can suppress the amount of deformation of the deformable layer 23 for the assumed load.

[Evaluation 2]

(Thirty-second Test)

A load of 500 gf was applied to the respective sensing faces 20S of the sensors 20 of Examples 1, 2, and 6 to 11 for 30 seconds, and the sensing face 20S was unloaded, and the return time until the delta value returned a threshold or less was measured. Note that the position where the load was applied is a position corresponding to the upper portions of the sensing units 30SE of the respective sensing faces 20S.

Table 3 indicates the evaluation results of the sensors 20 of Examples 1, 2, and 6 to 11. Note that, in Table 3, the thickness, 25% CLD, and density of the deformable layer 23 used in each Example are indicated. Note that the 25% CLD for the deformable layer 23 is a value obtained in accordance with the test method in JIS K 6254. Furthermore, the density of the deformable layer 23 is a value obtained in accordance with the test method in JIS K 6401.

TABLE 3

|  | Deformable layer | Thickness [μm] | 25% CLD [kPa] | Density [kg/m³] | 30-second test return time [ms] |
|---|---|---|---|---|---|
| Example 6 | PureCell 006 | 60 | 132 | 400 | 18000 or more |
| Example 7 | PureCell S006AD | 60 | 28 | 350 | 6021 |
| Example 8 | PureCell 010 | 100 | 52 | 300 | 2456 |
| Example 9 | PureCell S010 | 100 | 14 | 300 | 4784 |
| Example 10 | PureCell S010AD | 100 | 14 | 300 | 2234 |
| Example 11 | PureCell 020 | 200 | 36 | 250 | 497 |
| Example 1 | PureCell S020AD | 200 | 12 | 250 | 425 |
| Example 2 | Poron SR-S-32P | 200 | 11 | 320 | 705 |

Table 3 indicates the following. For the sensors 20 of Examples 1, 2, and 11, the return time at unloading can be 1 second or less. From the viewpoint of reducing the return time at unloading, it is preferable to decrease the 25% CLD for the deformable layer 23. Specifically, the 25% CLD for the deformable layer 23 is preferably 20 kPa or less. Furthermore, from the same viewpoint, the thickness of the deformable layer 23 is preferably increased. Moreover, from the same viewpoint, the density of the deformable layer 23 is preferably lowered.

[Evaluation 3]

The following evaluations were performed for the sensors 20 of Examples 1 to 5. Note that, in each of the following evaluations, the position where the load was applied is a position corresponding to the upper portions of the sensing units 30SE of the respective sensing faces 20S.

(Load Sensitivity)

First, a load was applied to each sensing face 20S, and a delta value (output value of the sensor 20) for the load was measured. Next, the load sensitivity of each sensor 20 was evaluated according to the following criteria, on the basis of the above measurement results. Table 4 indicates the delta values and evaluation results.

Good load sensitivity: A delta value of 70 or more with application of a load of 150 gf Poor load sensitivity: A delta value of less than 70 with application of a load of 150 gf Note that the minimum sensitivity is guaranteed, whereby the accuracy of pressing detection of the casing can be increased.

(Thirty-Second Test)

First, a load of 500 gf was applied to each sensing face 20S for 30 seconds, the sensing face 20S was unloaded, and time t until the delta value returned to a threshold or less was measured. Next, on the basis of the above measurement results, the responsiveness of each sensor 20 was evaluated according to the following criteria. Returning to Table 4, the time t [ms] and the evaluation results are indicated.

Good responsiveness: After unloading, the delta value returns to the threshold or less within one second.

Poor responsiveness: After unloading, the delta value does not return to the threshold or less within one second.

Note that when the return of the sensing face 20S is faster and the responsiveness is good, unloading can be detected more reliably, so that a comfortable operation feeling can be obtained.

(Multiple-Time Test)

Figure 32A:
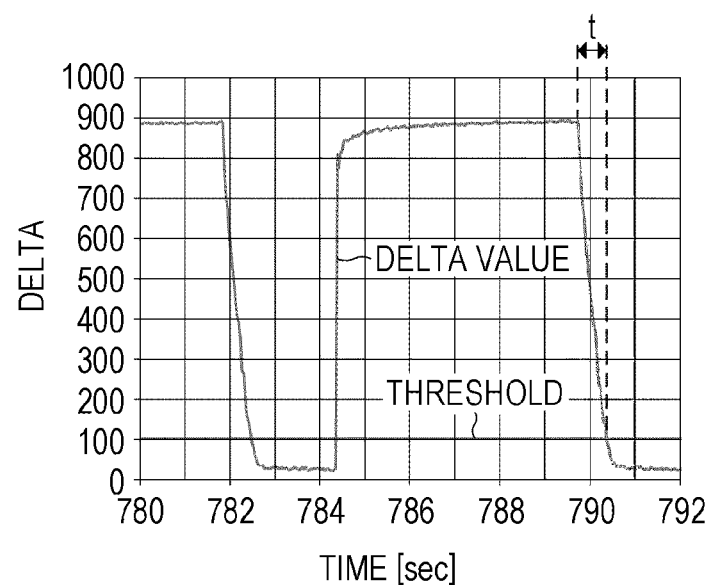
FIG. 32A is a graph illustrating a change in a delta value after successive 100 times of pressing a sensor of Example 4.
Figure 32B:
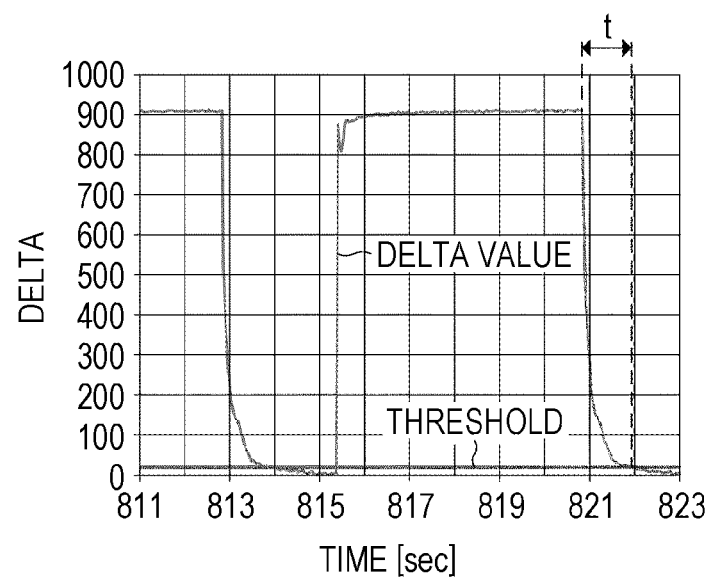
FIG. 32B is a graph illustrating a change in a delta value after successive 100 times of pressing a sensor of Example 5.

First, a load of 500 gf was applied to each sensing face 20S, the pressing operation of unloading was repeated 100 times in succession, and then time t until the delta value returned to a threshold or less was measured (see FIGS. 32A and 32B). Next, on the basis of the above measurement results, the responsiveness of each sensor 20 was evaluated according to the following criteria. Table 4 indicates the evaluation results. FIG. 32A illustrates the change in the delta value after successive 100 times of pressing of the sensor 20 of Example 4. FIG. 32B illustrates the change in the delta value after successive 100 times of pressing of the sensor 20 of Example 5.

Good responsiveness: After unloading, the delta value returns to the threshold or less within one second.

Poor responsiveness: After unloading, the delta value does not return to the threshold or less within one second.

Note that, as described above, when the return of the sensing face 20S is faster and the responsiveness is good, unloading can be detected more reliably, so that a comfortable operation feeling can be obtained.

(Durability Test)

First, a load was applied to each sensing face 20S, a change in the delta value for the load before a durability test, was measured, and then the delta value A for a load of 150 gf was obtained. Next, a load of 500 gf was applied to each sensing face 20S, and the pressing operation of unloading was repeated 30,000 times in succession. Subsequently, a load was applied to each sensing face 20S, a change in the delta value for the load after the durability test was measured, and then the load L(A) required to obtain the delta value A was obtained. Next, the load variation before and after the durability test for obtaining the delta value A was obtained by the following equation.

Load variation [%]=[(L(A) [gf]−150 [gf])/150 [gf]]× 100

Figure 33A:
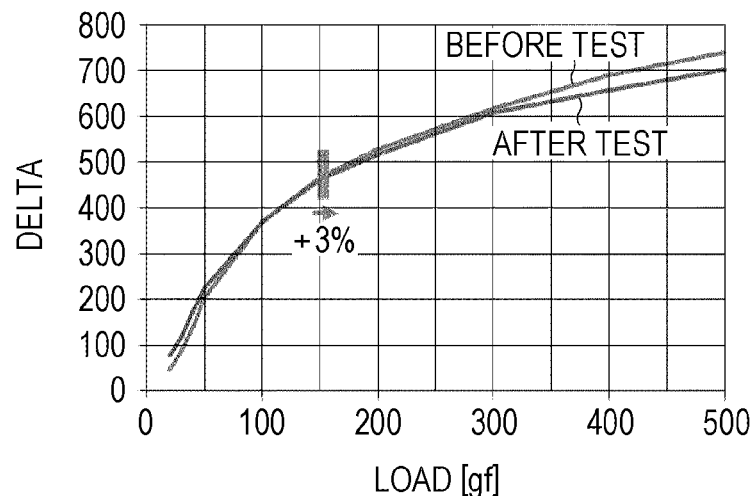
FIG. 33A is a graph illustrating a change in a delta value for a load before and after a durability test for the sensor 20 of Example 4.
Figure 33B:
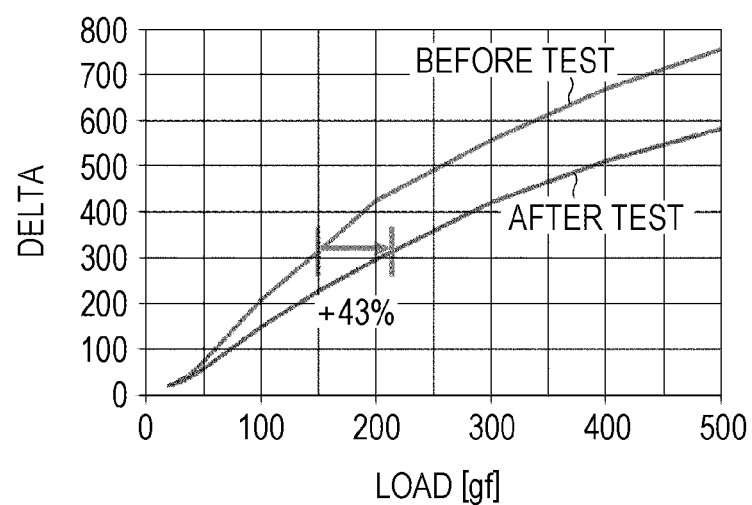
FIG. 33B is a graph illustrating a change in a delta value for a load before and after a durability test for the sensor 20 of Example 5.

Finally, on the basis of the obtained load variation, the durability of each sensor 20 against the successive multiple times of pressing was evaluated with the following criteria. Table 4 indicates the load variation and the evaluation results. FIG. 33A illustrates the change in the delta value for the load before and after the durability test of the sensor 20 of Example 4. FIG. 33B illustrates the change in the delta value for the load before and after the durability test of the sensor 20 of Example 5.

Good durability: The load variation is 25% or less.

Poor durability: The load variation exceeds 25%.

Note that suppression of the load variation can improve the durability against the successive multiple times of pressing. Therefore, it is unnecessary to additionally provide a highly rigid material on the sensor 20, and sensitivity loss can be avoided.

Table 4 indicates the evaluation results of the sensors 20 of Examples 1 to 5.

Table 4 indicates that the evaluation results of some tests (multiple-time test and durability test) are poor for the sensor 20 of Example 5, whereas the evaluation results of all the tests are good for the sensors 20 of Examples 1 to 4.

The embodiments of the present technology and the modified examples thereof have been specifically described above. However, the present technology is not limited to the above-described embodiments and the modified examples thereof, and various modifications based on the technical idea of the present technology can be made.

For example, the configurations, methods, processes, shapes, materials, numerical values, and the like described in the above embodiments and the modified examples thereof are merely examples, and configurations, methods, processes, shapes, materials, numerical values, and the like different from those described in the above-described embodiments and the modified examples thereof may be used as necessary.

Furthermore, the configurations, methods, processes, shapes, materials, numerical values, and the like of the above-described embodiments and the modified examples thereof can be combined with each other without departing from the gist of the present technology.

Furthermore, the present technology can also adopt the following configurations.

(1)

An electronic apparatus including:

an exterior body;

a pressure-sensitive sensor having a sensing face; and a support supporting the pressure-sensitive sensor such that an inner face of the exterior body is opposed to the sensing face.

(2)

The electronic apparatus according to (1), in which a space is provided between the inner face of the exterior body and the sensing face.

(3)

The electronic apparatus according to (1) or (2), in which the exterior body is capable of pressing the sensing face such that the exterior body presses against the sensing face.

(4)

The electronic apparatus according to any of (1) to (3), in which the exterior body has a sidewall, and the inner face of the exterior body opposed to the sensing face is an inner face of the sidewall.

TABLE 4

| | | Example 1 SUS (µm) | Example 2 | Example 3 Al vapor-deposited PET (100 µm) | Example 4 Al vapor-deposited PET (50 µm) | Example 5 |
|---|---|---|---|---|---|---|
| | Test items | PureCell S020AD | Poron SR-S-32P | Poron SR-S-32P | Poron SR-S-32P | PureCell 020 |
| Basic characteristics | Load sensitivity | Good (432) | Good (454) | Good (432) | Good (480) | Good (254) |
| Mechanical reliability | 30-second test | Good (554 ms) | Good (807 ms) | Good (712 ms) | Good (827 ms) | Good (774 ms) |
| | Multiple-time test | Good | Good | Good | Good | Poor |
| | Durability test | Good (−23%) | Good (−10%) | Good (−5%) | Good (+3%) | Poor (+43%) |

(5)

The electronic apparatus according to any of (1) to (4), further including: a cushioning material provided at least either between the exterior body and the pressure-sensitive sensor or between the support and the pressure-sensitive sensor.

(6)

The electronic apparatus according to (6), in which the cushioning material includes a foamed resin.

(7)

The electronic apparatus according to any of (1) to (6), in which at least one of the inner face of the exterior body or the sensing face is provided with a protrusion.

(8)

The electronic apparatus according to any of (1) to (7), in which the exterior body includes a metal or a polymer resin.

(9)

The electronic apparatus according to any of (1) to (8), in which the pressure-sensitive sensor includes:

an electrostatic-capacity-type sensor electrode unit having a plurality of sensing units;

a first reference electrode layer opposed to a first main face of the sensor electrode unit;

a second reference electrode layer opposed to a second main face of the sensor electrode unit; and a deformable layer provided at least either between the first reference electrode layer and the sensor electrode unit or between the second reference electrode layer and the sensor electrode unit, the deformable layer being elastically deformed by application of pressure.

(10)

The electronic apparatus according to (9), in which the deformable layer includes a foamed resin.

(11)

The electronic apparatus according to (9) or (10), in which the deformable layer has a hole.

(12)

The electronic apparatus according to any of (9) to (11), in which the sensor electrode unit includes a flexible printed circuit.

(13)

The electronic apparatus according to any of (9) to (12), in which the sensor electrode unit includes a base, a first electrode, and a second electrode, the first electrode and the second electrode being provided on the base, sensing units each include the first electrode and the second electrode, and first electrodes adjacent to each other are connected together via a through hole of the base.

(14)

The electronic apparatus according to any of (1) to (13), further including: a control unit configured to control the electronic apparatus, in which the control unit returns from a sleeping mode, in accordance with pressing of a plurality of sensing units of the pressure-sensitive sensor.

(15)

The electronic apparatus according to any of (1) to (14), further including: a control unit configured to control sound volume adjustment or screen display, in accordance with a slide operation on a plurality of sensing units of the pressure-sensitive sensor.

(16)

The electronic apparatus according to (15), in which the control of the screen display is control of screen scroll or pointer movement.

(17)

The electronic apparatus according to any of (1) to (16), further including: a control unit configured to start a camera application, in accordance with a pressing operation on a specified sensing unit of the pressure-sensitive sensor.

(18)

The electronic apparatus according to any of (1) to (17), further including: a control unit configured to control screen display on the basis of output profiles of a plurality of sensing units of the pressure-sensitive sensor.

(19)

An input device including:

an exterior body;

a pressure-sensitive sensor having a sensing face; and a support supporting the pressure-sensitive sensor such that an inner face of the exterior body is opposed to the sensing face.

(20)

A sensor including:

an electrostatic-capacity-type sensor electrode unit having a plurality of sensing units;

a first reference electrode layer opposed to a first main face of the sensor electrode unit;

a second reference electrode layer opposed to a second main face of the sensor electrode unit; and a deformable layer provided at least either between the first reference electrode layer and the sensor electrode unit or between the second reference electrode layer and the sensor electrode unit, the deformable layer being elastically deformed by application of pressure, in which the deformable layer includes a foamed resin.

REFERENCE SIGNS LIST

10, 10A, 100 Electronic apparatus
11 Exterior body
11M Main face
11R, 11L Side face portion
11SR, 11SL Inner face
11VR Sound volume adjustment region
11CR Camera holding region
11SHR Shutter operation region
12 Frame
12SR, 12SL Support face
13 Substrate
13a Controller IC
13b CPU
14 Front panel
14a Display device
20 Sensor
20S Sensing face
21, 22 Electrode base
21a, 22a Base
21b, 22b Reference electrode layer
30 Sensor electrode unit
30SE Sensing unit
31 Base
32 Pulse electrode (first electrode)
33 Sense electrode (second electrode)
23, 24 Deformable layer
25 to 27 Adhesive layer
71, 74 Cushioning material
72, 73 Pusher

What is claimed is:

1. An electronic apparatus comprising:
an exterior body;
a pressure-sensitive sensor having a sensing face; and
a support supporting the pressure-sensitive sensor, wherein an inner face of the exterior body is opposed to the pressure-sensitive sensor and is capable of pressing the sensing face, and wherein the exterior body is a resin sheet, an elastomer or an artificial leather.

2. The electronic apparatus according to claim 1, wherein a space is provided between the inner face of the exterior body and the pressure-sensitive sensor.

3. The electronic apparatus according to claim 1, wherein the exterior body is capable of pressing the sensing face such that the exterior body presses against the sensing face.

4. The electronic apparatus according to claim 1, wherein the exterior body has a sidewall, and the inner face of the exterior body opposed to the sensing face is an inner face of the sidewall.

5. The electronic apparatus according to claim 1, further comprising: a cushioning material provided at least either between the exterior body and the pressure-sensitive sensor or between the support and the pressure-sensitive sensor.

6. The electronic apparatus according to claim 5, wherein the cushioning material includes a foamed resin.

7. The electronic apparatus according to claim 1, wherein at least one of the inner face of the exterior body or the sensing face is provided with a protrusion.

8. The electronic apparatus according to claim 1, wherein the pressure-sensitive sensor includes:
 an electrostatic-capacity-type sensor electrode unit having a plurality of sensing units;
 a first reference electrode layer opposed to a first main face of the electrostatic-capacity-type sensor electrode unit;
 a second reference electrode layer opposed to a second main face of the electrostatic-capacity-type sensor electrode unit; and
 a deformable layer provided at least either between the first reference electrode layer and the electrostatic-capacity-type sensor electrode unit or between the second reference electrode layer and the electrostatic-capacity-type sensor electrode unit, the deformable layer being elastically deformed by application of pressure.

9. The electronic apparatus according to claim 8, wherein the first reference electrode layer or the second reference electrode layer is an inorganic-organic conductive layer, containing both an inorganic conductive material and an organic conductive material.

10. The electronic apparatus according to claim 8, wherein a thickness of the deformable layer is 180 μm or more.

11. The electronic apparatus according to claim 8, wherein a 25% compression load deflection (CLD) for the deformable layer is 36 kPa or less.

12. The electronic apparatus according to claim 8, wherein a density of the deformable layer is 320 kg or less.

13. The electronic apparatus according to claim 8, wherein the deformable layer includes a foamed resin.

14. The electronic apparatus according to claim 8, wherein the deformable layer has a hole.

15. The electronic apparatus according to claim 8, wherein the electrostatic-capacity-type sensor electrode unit includes a flexible printed circuit.

16. The electronic apparatus according to claim 8,
 wherein the electrostatic-capacity-type sensor electrode unit includes a base, a first electrode, and a second electrode, the first electrode and the second electrode being provided on the base,
 wherein sensing units each include the first electrode and the second electrode, and
 wherein first electrodes adjacent to each other are connected together via a through hole of the base.

17. The electronic apparatus according to claim 1, further comprising: a control unit configured to control the electronic apparatus, wherein the control unit returns from a sleeping mode, in accordance with pressing of a plurality of sensing units of the pressure-sensitive sensor.

18. The electronic apparatus according to claim 1, further comprising: a control unit configured to control sound volume adjustment or screen display, in accordance with a slide operation on a plurality of sensing units of the pressure-sensitive sensor.

19. The electronic apparatus according to claim 18, wherein control of the screen display comprises control of a screen scroll or a pointer movement.

20. The electronic apparatus according to claim 1, further comprising: a control unit configured to start a camera application, in accordance with a pressing operation on a specified sensing unit of the pressure-sensitive sensor.

21. The electronic apparatus according to claim 1, further comprising: a control unit configured to control screen display on a basis of output profiles of a plurality of sensing units of the pressure-sensitive sensor.

22. The electronic apparatus according to claim 1, wherein the electronic apparatus is a personal computer, a mobile phone other than a smart phone, a television, a remote controller, a camera, a game device, a navigation system, an electronic book, an electronic dictionary, a portable music player, a wearable terminal such as a smart watch, a head-mounted display, a radio, a stereo, a medical device, or a robot.

23. An input device comprising:
 an exterior body;
 a pressure-sensitive sensor having a sensing face; and
 a support supporting the pressure-sensitive sensor,
 wherein an inner face of the exterior body is opposed to the pressure-sensitive sensor and is capable of pressing the sensing face, and
 wherein the exterior body is a resin sheet, an elastomer or an artificial leather.

* * * * *